United States Patent
Miyagawa et al.

(10) Patent No.: US 8,169,883 B2
(45) Date of Patent: May 1, 2012

(54) OPTICAL DISK, METHOD FOR MANUFACTURING THE SAME, AND METHOD FOR RECORDING AND METHOD FOR REPRODUCING DATA USING OPTICAL DISK

(75) Inventors: Naoyasu Miyagawa, Kawanishi (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 1256 days.

(21) Appl. No.: 10/876,494

(22) Filed: Jun. 25, 2004

(65) Prior Publication Data

US 2004/0264339 A1    Dec. 30, 2004

(30) Foreign Application Priority Data

Jun. 25, 2003 (JP) ................................. 2003-181694

(51) Int. Cl.
G11B 7/24 (2006.01)
(52) U.S. Cl. ..................................... 369/275.1
(58) Field of Classification Search ............... 369/275.4, 369/94
See application file for complete search history.

(56) References Cited

U.S. PATENT DOCUMENTS

| | | | |
|---|---|---|---|
| 5,608,715 A | 3/1997 | Yokogawa et al. | |
| 5,940,364 A | 8/1999 | Ogata et al. | |
| 6,072,759 A * | 6/2000 | Maeda et al. | 369/59.25 |
| 6,134,196 A * | 10/2000 | Sato et al. | 369/44.27 |
| 7,184,377 B2 * | 2/2007 | Ito et al. | 369/47.14 |
| 7,221,644 B2 * | 5/2007 | Kobayashi et al. | 369/275.5 |
| 7,376,058 B2 * | 5/2008 | Narumi et al. | 369/47.53 |
| 2001/0014074 A1 * | 8/2001 | Muramatsu et al. | 369/111 |
| 2002/0054550 A1 * | 5/2002 | Tomita | 369/47.5 |
| 2002/0136122 A1 * | 9/2002 | Nakano | 369/47.53 |
| 2002/0176971 A1 | 11/2002 | Ohsawa et al. | |
| 2003/0129408 A1 * | 7/2003 | Thompson et al. | 428/411.1 |
| 2003/0137915 A1 * | 7/2003 | Shoji et al. | 369/59.25 |
| 2003/0151994 A1 * | 8/2003 | Tasaka et al. | 369/47.53 |
| 2003/0185121 A1 * | 10/2003 | Narumi et al. | 369/47.53 |
| 2003/0227846 A1 * | 12/2003 | Lee et al. | 369/53.21 |

(Continued)

FOREIGN PATENT DOCUMENTS

CN    1388525    1/2003

(Continued)

*Primary Examiner* — Joseph Feild
*Assistant Examiner* — Henok Heyi
(74) *Attorney, Agent, or Firm* — Hamre, Schumann, Mueller & Larson, P.C.

(57) ABSTRACT

An optical disk includes a first information recording layer, and second to N-th information recording layers (with N being an integer of two or greater) that are arranged further toward the side from which laser light is irradiated than the first information recording layer and which are arranged in order from the side near the first information recording layer. The first information recording layer includes a read-only control data region, a first recording learning region for learning recording parameters to record data, and a first user data recording region for recording user data. When taking at least one of the second to N-th information recording layers as an i-th information recording layer (with i being an integer satisfying $2 \leq i \leq N$), that i-th information recording layer includes an i-th recording learning region for learning recording parameters to record data in the i-th information recording layer, and an i-th user data recording region for recording user data. The first recording learning region and the i-th recording learning region are arranged at different radial positions, and the i-th recording learning region is arranged within a region of radial positions at which the control data region is provided.

23 Claims, 12 Drawing Sheets

Direction of laser light irradiation

U.S. PATENT DOCUMENTS

| | | | |
|---|---|---|---|
| 2004/0013067 A1* | 1/2004 | Lee et al. | 369/53.22 |
| 2004/0085874 A1* | 5/2004 | Akiyama et al. | 369/47.53 |
| 2004/0264339 A1* | 12/2004 | Miyagawa et al. | 369/94 |
| 2005/0013222 A1* | 1/2005 | Lee et al. | 369/47.51 |
| 2007/0104057 A1* | 5/2007 | Martens et al. | 369/47.53 |

FOREIGN PATENT DOCUMENTS

| | | | |
|---|---|---|---|
| EP | 1 244 096 | | 9/2002 |
| EP | 1 318 509 | | 6/2003 |
| JP | 8-096406 | | 4/1996 |
| JP | 10-003697 | | 1/1998 |
| JP | 10-21673 | | 1/1998 |
| JP | 2000-311346 | * | 7/2000 |
| JP | 2001-311346 | | 11/2000 |
| JP | 2001-338422 | | 12/2001 |
| WO | 02/23542 | | 3/2002 |
| WO | 2004/112007 | | 12/2004 |

* cited by examiner

Direction of laser light irradiation

Direction of laser light irradiation

Direction of laser light irradiation

OPTICAL DISK, METHOD FOR MANUFACTURING THE SAME, AND METHOD FOR RECORDING AND METHOD FOR REPRODUCING DATA USING OPTICAL DISK

BACKGROUND OF THE INVENTION

1. Field of the Invention

The present invention relates to an optical disk including a plurality of information recording layers, wherein at least two information recording layers are provided with recording learning regions for determining optimal recording parameters respectively, to a method for manufacturing such a disk, as well as to a method for recording and a method for reproducing data using such an optical disk.

2. Related Background Art

In recent years, as the recording density and the capacity of optical disks increase, it is becoming more important to ensure the reliability of optical disks. Accordingly, to ensure reliability, a technology has been proposed in which the optical disk is provided with a recording learning region, and a recording learning process is performed to determine the recording parameters by carrying out a test recording on this recording learning region (see for example JP 2001-338422A). "Recording learning" means the operation of optimizing the pulse parameters related to the laser light that is irradiated onto the optical disk during the recording. The pulse parameters include, for example, the power of the laser pulses irradiated onto the optical disk during recording, as well as the timing at which the laser pulses are generated, and their length.

Furthermore, there is vigorous research in optical disks whose recording capacity is doubled by arranging an information recording layer that is semi-transparent for recording and reproducing laser light on the side from which laser light is irradiated (i.e. frontward), and arranging a further information recording layer behind that, thus providing a dual-layer structure. Also in such dual-layer optical disks, recording learning is necessary, and a technology has been proposed, in which both the frontward information recording layer (referred to as "L1 layer") and the rearward information recording layer (referred to as "L0 layer") are subjected to the learning of recording parameters prior to the recording of data (see for example JP 2000-311346A).

However, there is the possibility that the optimal recording parameters for the L0 layer cannot be extracted through this recording learning operation. In recording learning, it is conceivable that test signals are recorded at a power that is considerably higher than the recording power that is optimal for the recording of data (optimum recording power). Thus, even in optical disks in which the presence of recordings in the L1 layer does not affect the quality of recordings to the L0 layer at the optimum recording power, there may be intensity changes when the laser light passes through the L1 layer at a test recording power that is relatively high, and it is conceivable that the optimum recording power for the L0 layer cannot be obtained by a recording learning operation.

SUMMARY OF THE INVENTION

It is an object of the present invention to provide an optical disk provided with a plurality of recordable information recording layers, in which recording learning with high precision is possible in information recording layers to the rear, regardless of the recording state of the information recording layers positioned on the side from which laser light is irradiated, as well as a method for manufacturing such an optical disk and a method for recording and a method for reproducing data using such an optical disk.

In accordance with one aspect of the present invention, an optical disk comprises a plurality of information recording layers, in which data is recorded in tracks by laser light that is irradiated from one side, the tracks being provided respectively in the plurality of information recording layers. The plurality of information recording layers comprise a first information recording layer and second to N-th information recording layers (with N being an integer of two or greater) that are arranged further toward the side from which the laser light is irradiated than the first information recording layer and which are arranged in order from the side near the first information recording layer. The first information recording layer comprises a read-only control data region, a first recording learning region for learning recording parameters to record data in the first information recording layer, and a first user data recording region for recording user data. When taking at least one of the second to N-th information recording layers as an i-th information recording layer (with i being an integer satisfying $2 \leq i \leq N$), that i-th information recording layer comprises an i-th recording learning region for learning recording parameters to record data in the i-th information recording layer, and an i-th user data recording region for recording user data. The first recording learning region and the i-th recording learning region are arranged at different radial positions, and the i-th recording learning region is arranged within a region of radial positions at which the control data region is provided.

It should be noted that in the optical disk of the present invention, the i-th recording learning region being arranged within a region of radial positions at which the control data region is provided also includes the case that the i-th recording learning region protrudes slightly from the region of radial positions at which the control data region is provided, such as when there is track eccentricity or track tolerance.

It should further be noted that in the optical disk of the present invention, N=2 means that there is one information recording layer arranged further toward the side from which laser light is irradiated than the first information recording layer. That is to say, in this case, only the second information recording layer is arranged further toward the side from which laser light is irradiated than the first information recording layer.

In accordance with another aspect of the present invention, a method is for manufacturing an optical disk comprising a first information recording layer and second to N-th information recording layers (with N being an integer of two or greater) that are arranged further toward the side from which the laser light is irradiated than the first information recording layer and are arranged in order from the side near the first information recording layer. The method comprises forming the first information recording layer such that the first information recording layer comprises at least a read-only control data region, a first recording learning region for learning recording parameters to record data in the first information recording layer, and a first user data recording region for recording user data. When taking at least one of the second to N-th information recording layers as an i-th information recording layer (with i being an integer satisfying $2 \leq i \leq N$), That i-th information recording layer is formed such that the i-th information recording layer comprises an i-th recording learning region for learning recording parameters to record data in the i-th information recording layer, and an i-th user data recording region for recording user data; and the first recording learning region and the i-th recording learning region are formed such that the first recording learning region and the i-th recording learning region are arranged at different radial positions, and the i-th recording learning region is arranged within a region of radial positions at which the control data region is provided.

Yet another aspect of the present invention is a recording method for recording data in tracks by irradiating laser light from one side, the tracks being provided respectively in a plurality of information recording layers included in the optical disk. The optical disk comprises a first information recording layer, and second to N-th information recording layers (with N being an integer of two or greater) that are arranged further toward the side from which the laser light is irradiated than the first information recording layer and which are arranged in order from the side near the first information recording layer. The first information recording layer comprises a read-only control data region, a first recording learning region for learning recording parameters to record data in the first information recording layer, and a first user data recording region for recording user data. The second to N-th information recording layers respectively comprise a second to N-th recording learning region for learning recording parameters to record data in the second to N-th information recording layers, and a second to N-th user data recording region for recording user data. Before data is recorded in the first to N-th information recording layers, laser light is irradiated via at least one of the second to N-th recording learning regions to at least a portion of the control data regions, and control data that is recorded in the control data region is reproduced.

Yet another aspect of the present invention is a reproduction method for reproducing data recorded in tracks by irradiating laser light from one side, the tracks being provided respectively in a plurality of information recording layers included in the optical disk. The optical disk comprises a first information recording layer, and second to N-th information recording layers (with N being an integer of two or greater) that are arranged further toward the side from which the laser light is irradiated than the first information recording layer and which are arranged in order from the side near the first information recording layer. The first information recording layer comprises a read-only control data region, a first recording learning region for learning recording parameters to record data in the first information recording layer, and a first user data recording region for recording user data. The second to N-th information recording layers respectively comprise a second to N-th recording learning region for learning recording parameters to record data in the second to N-th information recording layers, and a second to N-th user data recording region for recording user data. Before data is reproduced from the first to N-th information recording layers, laser light is irradiated via at least one of the second to N-th recording learning regions to at least a portion of the control data regions, and control data that is recorded in the control data region is reproduced.

DETAILED DESCRIPTION OF THE INVENTION

Figure 1:
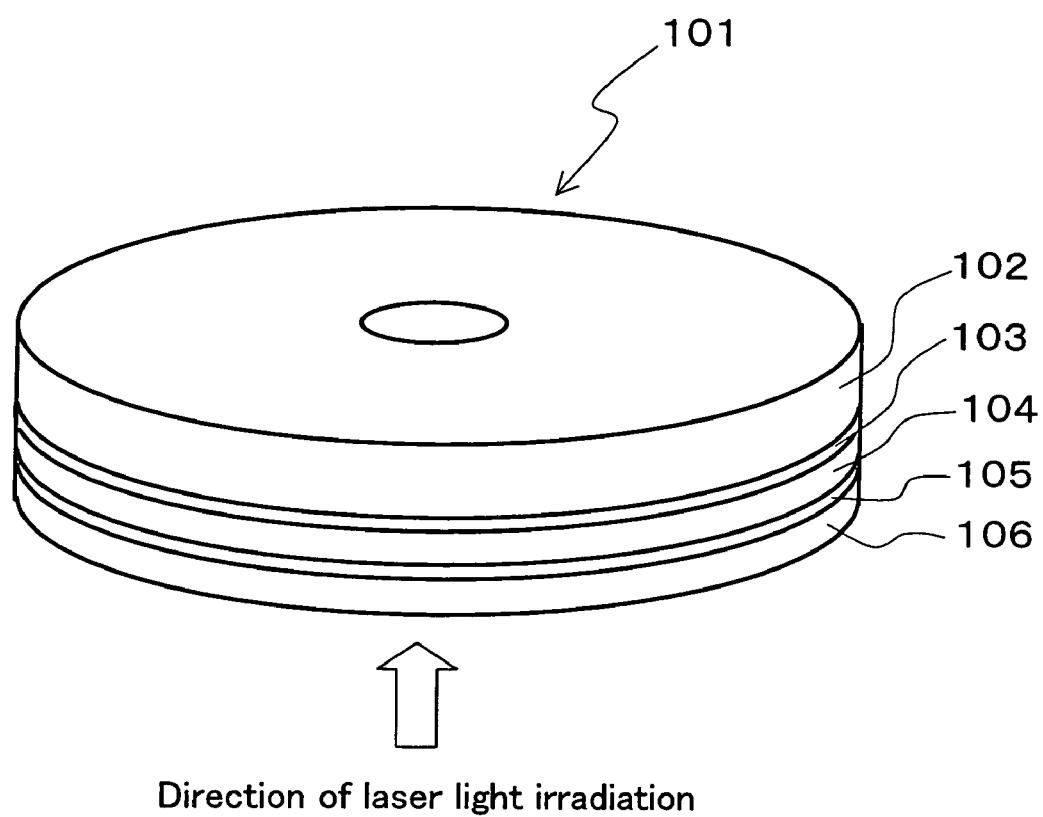
FIG. 1 is a perspective view showing an optical disk according to Embodiment 1 of the present invention.

In the optical disk according to the present invention, the first information recording layer comprises a read-only control data region and a first recording learning region, and at least one of the second to N-th information recording layers (i-th information recording layer) arranged further toward the side from which laser light is irradiated than the first information recording layer comprises an i-th recording learning region that is arranged within a region of radial positions at which the control data region of the first information recording layer is provided. That is to say, the first information recording layer and at least one of the second to N-th information recording layers are configured such that the recording learning regions included therein are not disposed at the same radial positions (that is, the recording learning regions do not overlap). For example, explaining this for the case when there are two information recording layers (a first information recording layer and a second information recording layer) included in the optical disk of the present invention, the second information recording layer includes a second recording learning region for learning the recording parameters to record data in the second information recording layer, as well as a second user data recording region for recording user data, the first recording learning region and the second recording learning region are arranged at regions of different radial positions, and the second recording learning region is arranged in opposition to the control data region. Consequently, even when the intensity of the laser light passing through the i-th information recording layer positioned in front is affected by the recording state of the i-th information recording layer positioned in front, suitable recording learning becomes possible for the first information recording layer. Moreover, the i-th recording learning region is arranged within a range of radial positions at which the control data region of the first information recording layer is disposed. That is to say, the i-th recording learning region and the control data region overlap, but even if the intensity of the laser light changes due to the recording state of the i-th recording learning region when the laser light passes through the i-th information recording layer arranged in front, the quality of the control data reproduction signal hardly is affected by that. Moreover, at least the control data region, the first recording learning region and the first user data recording region may be arranged in that order from a radially inward side in the first information recording layer, and at least the i-th recording learning region and the i-th user data recording region may be arranged in that order from the radially inward side in the i-th information recording layer.

In the optical disk according to the present invention, when N is 3 or greater, and at least two information recording layers included in the second to N-th information recording layers each comprise a recording learning region for learning recording parameters to record data, then it is preferable that the recording learning regions included in those two information recording layers are arranged at different radial positions. Thus, when performing the recording learning in the information recording layer arranged to the rear when seen from the side from which laser light is irradiated, then the recording learning is not affected by the recording state of the information recording layer arranged to the front when seen from the side from which laser light is irradiated, so that suitable recording learning becomes possible for the information recording layer positioned to the rear.

In the optical disk according the present invention, when N is 3 or greater, and when taking at least one of the third to N-th information recording layers as a j-th information recording layer (with j being an integer satisfying $3 \leq j \leq N$), and this j-th information recording layer comprises a j-th recording learning region for learning recording parameters to record data in the j-th information recording layer, then it is preferable that the j-th recording learning region is arranged within a region of radial positions at which regions are provided in which no data recording is performed in the second to (j−1)-th information recording layer. Thus, it is possible to realize an optical disk having a plurality of information recording layers, without diminishing the recording capacity.

In the optical disk according to the present invention, when a k-th information recording layer (with k being an integer satisfying $1 \leq k \leq N-1$) included in the first to N-th information recording layers comprises a k-th recording learning region for learning recording parameters to record data in the k-th information recording layer, and a (k+1)-th information recording layer included in the first to N-th information recording layers comprises a (k+1)-th recording learning region for learning recording parameters to record data in the (k+1)-th information recording layer, then it is preferable that an innermost radius (R1) of the k-th recording learning region, an outermost radius (R2) of the (k+1)-th recording learning region, and a maximum value ($\Delta e$) of a track eccentricity in the k-th information recording layer and the (k+1)-th information recording layer satisfy the relationship $R1-R2 \geq 2\Delta e$. In this case, it is preferable that the innermost radius (R1) of the k-th recording learning region, the outermost radius (R2) of the (k+1)-th recording learning region, the maximum value ($\Delta e$) of the track eccentricity in the k-th information recording layer and the (k+1)-th information recording layer, and a beam diameter (D) of the laser light in the (k+1)-th information recording layer when the laser light is converged onto the k-th information recording layer satisfy the relationship $R1-R2 \geq 2\Delta e+D$. Furthermore, it is preferable that the innermost radius (R1) of the k-th recording learning region, the outermost radius (R2) of the (k+1)-th recording learning region, the maximum value ($\Delta e$) of the track eccentricity in the k-th information recording layer and the (k+1)-th information recording layer, and the tolerance ($\Delta r$) of the radial position of a track starting end satisfy the relationship $R1-R2 \geq 2(\Delta e+\Delta r)$. And considering the beam diameter (D) of the laser light in the (k+1)-th information recording layer when the laser light is converged onto the k-th information recording layer, it is preferable that the relationship $R1-R2 \geq 2(\Delta e+\Delta r)+D$ is satisfied. By setting R1−R2 in this manner, even when there is a track eccentricity or a tolerance of a track, it can be ensured that the k-th recording learning region and the (k+1)-th recording learning region included in adjacent information recording layers do not overlap, so that the recording learning can be performed adequately for the k-th information recording region to the rear.

In the optical disk according to the present invention, it is preferable that a distance from the side from which the laser light is irradiated to the first information recording layer is equivalent to a distance, in an optical disk having a single information recording layer, from the side from which the laser light is irradiated to the single information recording layer.

In the optical disk according to the present invention, control data relating to the first to N-th information recording layers may be stored in the control data region. In this case, identification information of all information recording layers can be obtained by accessing the first information recording layer, and there is the advantage that the start-up operation can be performed faster, for example.

In the optical disk according to the present invention, writing of user data to the first to N-th information recording layers may be performed continuously from a radially inward side to a radially outward side or from the radially outward side to the radially inward side. By setting the writing direction in this manner, it is possible to write user data into the information recording layer on the rear without being affected by the recording state of the information recording layers to the front. As a result, there is, for example, the advantage that a broader range of materials can be selected as the material for the information recording layers to the front is broadened.

In the optical disk according to the present invention, it is preferable that control data is pre-recorded in the control data region by at least one selected from embossed pits, wobble grooves and wobble pits.

The plurality of information recording layers in the optical disk of the present invention further may comprise an information recording layer that is arranged on the opposite side of the first information recording layer with respect to the side from which laser light is irradiated.

According to the method for manufacturing an optical disk according to the present invention, a first information recording layer and an i-th information recording layer, which is at least one of a second to N-th information recording layer, are formed such that the first information recording layer and the i-th information recording layer are arranged at different radial positions, and the i-th recording learning region is arranged within a region of radial positions at which a control data region is provided. Consequently, it is possible to provide an optical disk allowing recording learning with high precision for the first information recording layer, regardless of the recording state of the i-th information recording layer positioned to the side from which laser light is irradiated in the disk according to the present invention.

According to the data recording method and the data reproducing method of the present invention, before data is recorded or reproduced, laser light is irradiated onto the control data region via the recording learning regions of the information recording layers arranged to the front of the first information recording layer when seen from the side from which laser light is irradiated, and the control data is reproduced. Thus, identification information or the like can be obtained for each information recording layer, and data recording and reproduction can be performed with suitable parameters for each information recording layer.

The following is a more detailed explanation of embodiments of the present invention, with reference to the accompanying drawings.

Embodiment 1

FIG. 1 is a perspective view showing an embodiment of an optical disk according to the present invention. The optical disk 101 according to this embodiment is a single-side dual-layer optical disk that is provided with two information recording layers, in which recording and reproduction of data on the information recording layers are performed with laser light that is irradiated from one side. In FIG. 1, numeral 102 denotes a substrate, numeral 103 denotes a first information recording layer, numeral 104 denotes a spacer layer made of an adhesive resin or the like, numeral 105 denotes a second information recording layer, and numeral 106 denotes an optically transparent layer. Laser light is irradiated from the side of the optically transparent layer 106 and data is recorded in the first information recording layer 103 and the second information recording layer 105, or reproduced therefrom. As for the thickness of the respective layers, the optically transparent layer 106 is set to 70 to 80 µm, the spacer layer 104 is set to 20 to 30 µm (the total thickness of the optically transparent layer 106 and the spacer layer 104 being set to 95 to 105 µm), the substrate 102 is set to 1.1 mm, and both the first information recording layer 103 and the second information recording layer 105 are set to several 10 nm to several 100 nm. The laser light for recording on or reproducing from an optical disk provided with such layers has, for example, a wavelength of 405 nm and the numerical aperture of the condensing lens may be, for example, 0.85.

In the dual-layer optical disk 101 of the present embodiment, it is preferable that the position of the first information recording layer 103 with respect to the side from which the light is irradiated is the same as the position, with respect to the side from which the light is irradiated, of the information recording layer of a single-layer optical disk (not shown in the drawings) having only one information recording layer. For example, the first information recording layer 103 may be arranged at a position of about 100 µm from the side from which light is irradiated.

Figure 2:
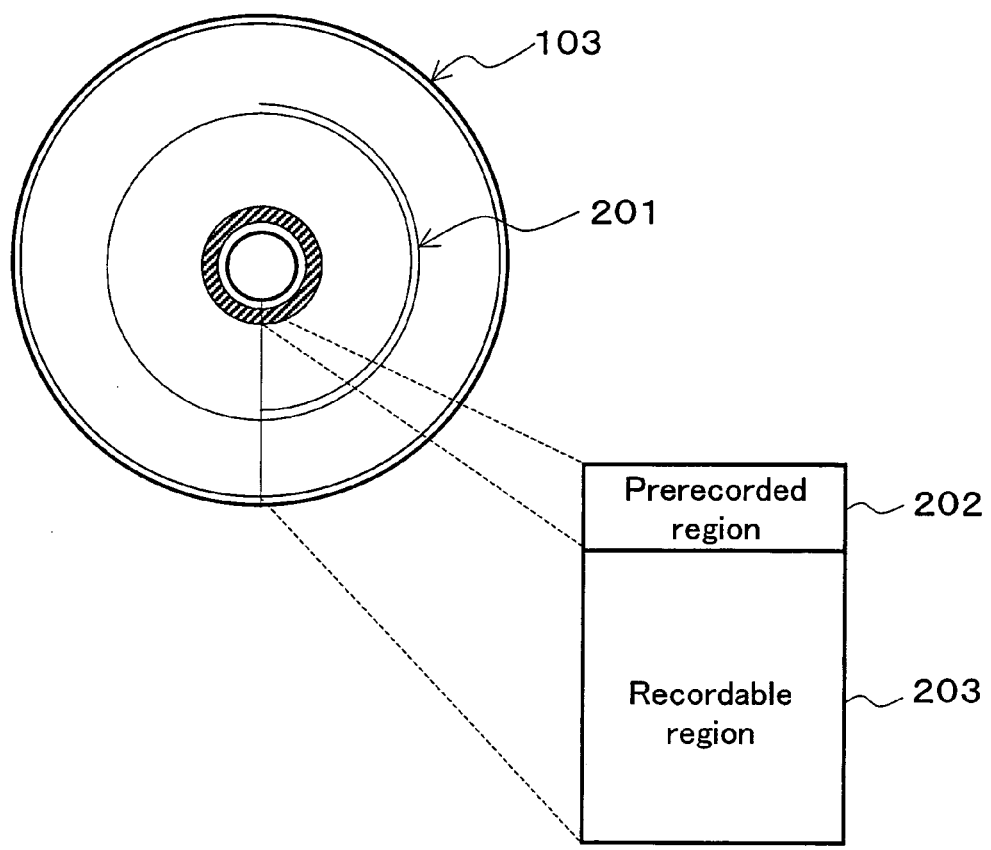
FIG. 2 is a diagram of the structure of the first information recording layer in this optical disk of Embodiment 1 of the present invention.

FIG. 2 shows the structure of the first information recording layer 103 in this optical disk 101. The first information recording layer 103 is provided with a track 201. The track 201 may be formed as a plurality of tracks arranged in concentric circles, or it may be formed as a single spiral-shaped track, or as a plurality of spiral-shaped tracks.

The first information recording layer 103 includes a prerecorded region 202 and a recordable region 203. In the prerecorded region 202, various kinds of parameters that are necessary for accessing the first information recording layer 103 are stored. The prerecorded region 202 is arranged at the inner circumference of the optical disk. The test recording for the recording learning and the recording of user data are carried out in the recordable region 203. The recordable region 203 is arranged radially outward from the prerecorded region 202.

It should be noted that FIG. 2 shows the configuration of the first information recording layer 103, but the configuration of the second information recording layer 105 is substantially the same.

Figure 3:
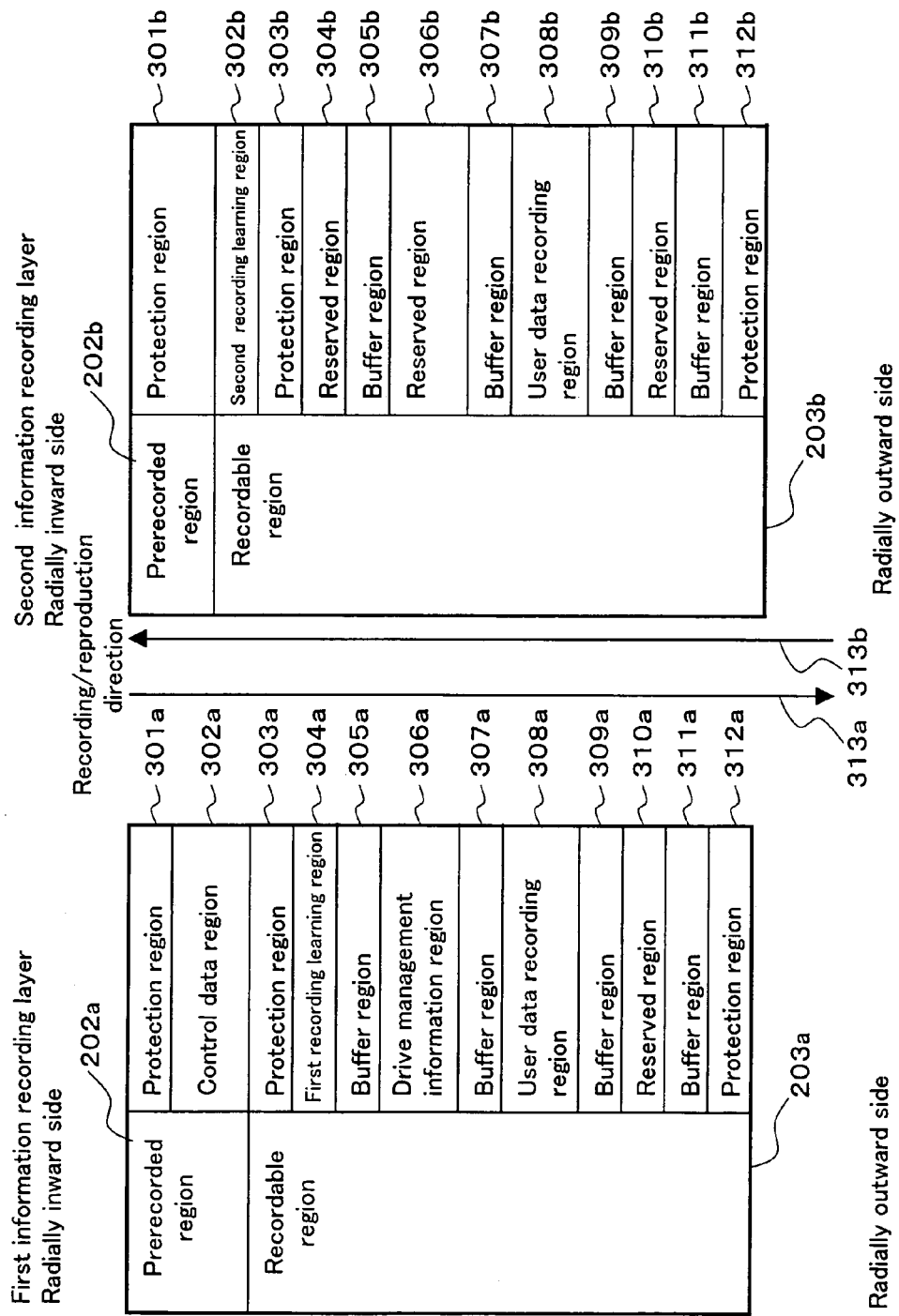
FIG. 3 is a diagram of the structure in which regions are arranged in the information recording layers of the optical disk according to Embodiment 1 of the present invention.

FIG. 3 shows one example of the structure in which regions are arranged in the first information recording layer 103 and the second information recording layer 105 of the optical disk 101 shown in FIG. 1.

The prerecorded region 202a of the first information recording layer 103 is a region recording such information as identification information of the optical disk. In this region, the information is recorded in embossed pits, wobble grooves or wobble pits or the like formed in the substrate 102 or the spacer layer 104 (see FIG. 1).

The prerecorded region 202a includes a protection region 301a serving as a buffer and a control data region 302a. Recorded as ID information of the optical disk in the control data region 302a is at least one of disk type, disk size, disk structure, channel bits, data zone arrangement information, linear recording speed, maximum reproduction power, recording power information, recording pulse information and disk-specific information. In this embodiment, the control data region 302a includes both information relating to the first information recording layer and information relating to the second information recording layer.

The prerecorded region 202b of the second information recording layer includes at least a protection region 301b serving as a buffer.

A recordable region 203a of the first information recording layer includes a protection region 303a not including any data, a first recording learning region 304a, a buffer region 305a, a drive management information region 306a used for storing information such as the various characteristics of the optical disk 101, a buffer region 307a, a user data recording region 308a for storing user data and the like, a buffer region 309a, a reserved region 310a, which is an empty region for future expansion, a buffer region 311a, and a protection region 312a not including any data. The protection region 303a can be used as a region for shifting the track pitch if the track pitch of the prerecorded region 202a and the recordable region 203a are different.

The recordable region 203b of the second information recording layer includes a second recording learning region 302b, a protection region 303b, a reserved region 304b, a buffer region 305b, a reserved region 306b, a buffer region 307b, a user data region 308b for storing user data and the like, a buffer region 309b, a reserved region 310b, a buffer region 311b, and a protection region 312b. The protection regions 303b and 312b do not include any data. The reserved regions 304b, 306b and 310b are empty regions for future expansion.

The protection region 303a included in the first information recording layer and the protection region 303b included in the second information recording layer are arranged at the same radial positions.

Furthermore, the second recording learning region 302b included in the second information recording layer is arranged at the same radial position as the control data region 302a of the first information recording layer, or its radially outermost position is arranged at the same position as the radially outermost position of the control data region 302a.

The reserved region 304b, the buffer region 305b and the reserved region 306b included in the recordable region 203b of the second information recording layer may be arranged at the same radial positions as the first recording learning region 304a, the buffer region 305a and the drive management information region 306a, respectively, of the first information recording layer.

Furthermore, the buffer region 307b, the user data recording region 308b, the buffer region 309b, the reserved region 310b, the buffer region 311b and the protection region 312b included in the recordable region 203b of the second information recording layer may be arranged at the same radial position as the buffer region 307a, the user data recording region 308a, the buffer region 309a, the reserved region 310a, the buffer region 311a and the protection region 312a, respectively, of the first information recording layer 103.

In this embodiment, the direction in which the optical disk 101 is rotated and the tracks are followed to record or reproduce information is from the inner side to the outer side (see arrow 313a) for the first information recording layer 103, and from the outer side to the inner side (see arrow 313b) for the second information recording layer 105, and recording and reproduction is performed continuously across them. Moreover, in this embodiment, before recording or reproducing data with this optical disk, first, a portion or all of the control data recorded in the control data region 302a of the first information recording layer is read out by irradiating laser light onto the control data region 302a via the second recording learning region 302b of the second information recording layer.

Figure 4:
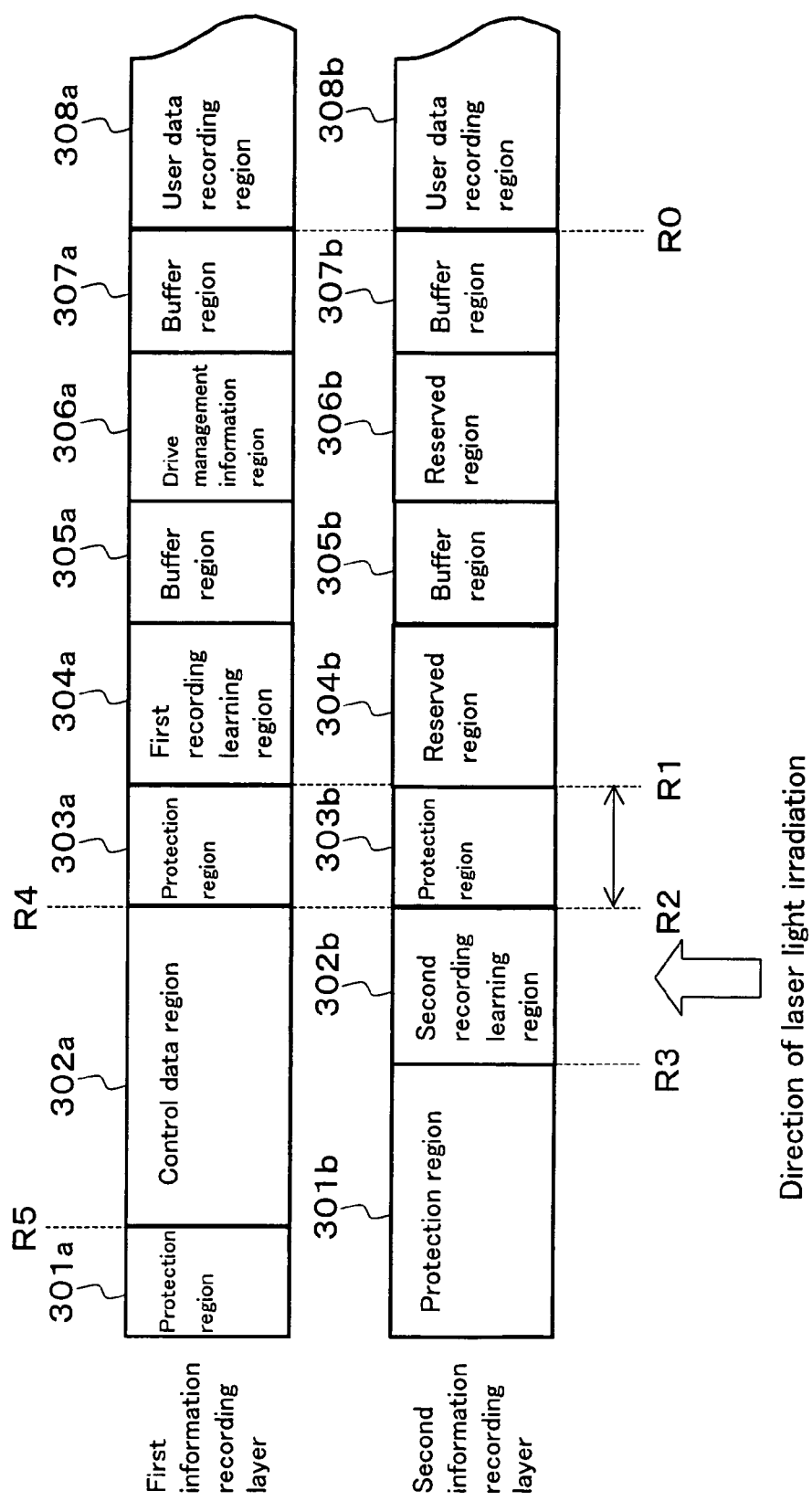
FIG. 4 is a diagram of the arrangement of the regions, which shows the relationship of the radial positions of the main regions included in the first information recording layer and the second information recording layer in the optical disk according to Embodiment 1 of the present invention.

FIG. 4 is a diagram of the arrangement of the regions, which shows the relationship of the radial positions of the main regions included in the first information recording layer and the second information recording layer in the optical disk of the present embodiment. In FIG. 4, the protection region 301a, the control data region 302a, the protection region 303a, the first recording learning region 304a, the buffer region 305a, the drive management information region 306a, the buffer region 307a, and the user data recording region 308a of the first information recording layer are shown in the upper portion. The protection region 301b, the second recording learning region 302b, the protection region 303b, the reserved region 304b, the buffer region 305b, the reserved region 306b, the buffer region 307b, and the user data recording region 308b of the second information recording layer are shown in the lower portion.

The second recording learning region 302b is arranged in opposition to the control data region 302a of the first information recording layer. That is to say, the second recording learning region 302b is arranged within the range of radial positions at which the control data region 302a is provided. It should be noted that if there are track eccentricities or tolerances, then a portion of the second recording learning region 302b may protrude slightly from the control data region 302a (and overlap slightly with the protection region 303a), but also in such a case, the second recording learning region 302b is regarded to be arranged within the range of radial positions of the control data region 302a. More specifically, the outermost radius R2 of the second recording learning region 302b is the same as the outermost radius R4 of the control data region 302a, and the innermost radius R3 of the second recording learning region 302b is the same as or larger than the innermost radius R5 of the control data region 302a. In the control data region 302a, the laser light is irradiated onto the pits or wobble shapes, the amount of reflected light is measured, and only the control data recorded there are reproduced. When the laser light passes through the second information recording layer, the quality of the reproduction signal of the control data is hardly affected at all, even when there are intensity changes due to the recording state of the second recording learning region 302b.

Referring to FIGS. 12A to 12D, the following is a simple explanation of a method for manufacturing an optical disk according to an embodiment of the present invention (see FIG. 1).

Figure 12A:
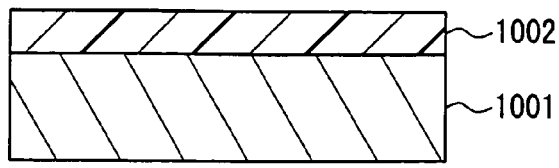
FIGS. 12A to 12F are cross-sectional drawings illustrating an example of a method for manufacturing a master stamper that is used in a method for manufacturing an optical disk according to the present invention.
Figure 12B:
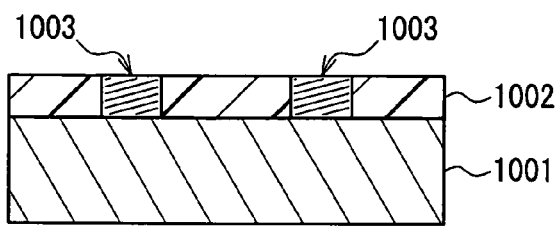
Figure 12C:
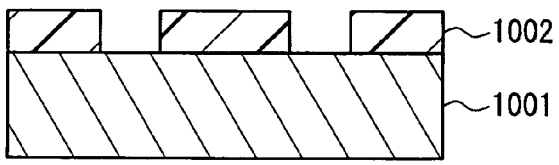
Figure 12D:
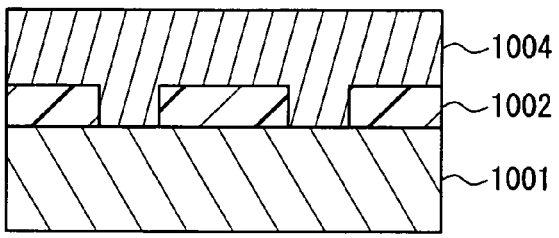
Figure 12E:
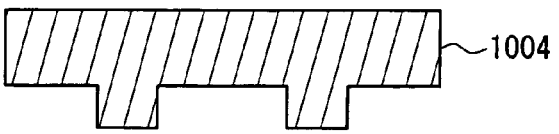
Figure 12F:
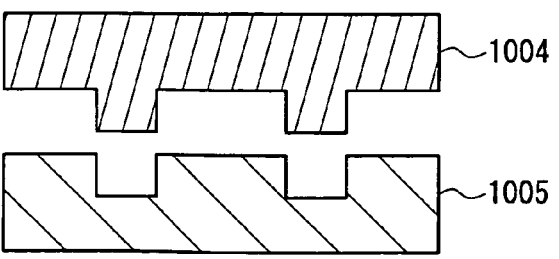

First, a master stamper for forming tracks or embossed pits for recording information signals in the substrate 102 is fabricated. The following is a description of an example of a method for forming the master stamper. First, a photoresist is applied to a stamper plate 1001 to form a photoresist layer 1002 (see FIG. 12A). The stamper plate 1001 thus provided with this photoresist layer 1002 is rotated, and a spiral-shaped track forming portion is exposed on the photoresist layer 1002 by irradiating laser light onto the photoresist layer 1002 while moving the irradiation position at a predetermined speed in the radial direction (see FIG. 12B). In FIG. 12B, numeral 1003 denotes exposed portions in the photoresist layer 1002. During this, the track can be provided with a certain wobble by arranging an optical deflector (not shown in the drawings) in the light path of the laser light, and letting the laser light oscillate slightly back and forth in the radial direction in accordance with an input signal (for example a signal corresponding to the address information). Thus, the address information can be recorded over the entire disk surface as the wobble of the track. Furthermore, it is also possible to form the track not only with a wobble in accordance with the address information, but also with a wobble in accordance with the control data at the radial position corresponding to the above-noted control data region. Thus, by forming the control data at a predetermined position, it is possible to perform a control data region at a predetermined radial position. After the exposure, lands and grooves are formed by developing and etching (see FIG. 12C). Then, a master stamper 1004 is formed by transferring this structure of lands and grooves (see FIG. 12D). The optical disk of this embodiment employs what is called "in-groove recording" in which data is recorded on grooves, which form projections as seen from the side from which the laser light is irradiated. Thus, a mother stamper 1005 (see FIG. 12F) further is formed by transferring the pattern of the master stamper 1004.

Using the mother stamper 1005 formed as described above, a substrate 102 is formed whose surface is provided with a track corresponding to address signals or control data, by injection molding using a material such as polycarbonate or PMMA. By forming the substrate 102 in this manner, it is possible to arrange the regions of the first information recording layer 103 formed in the substrate 102 at a later step in the arrangement shown in FIG. 4. It should be noted that in the above-described method, the control data region was formed with a wobble, but the control data region may also be formed by embossed pits. In this case, a light intensity modulator is provided instead of the light deflector in the laser light path, and pit-shaped exposed portions can be formed in the photoresist layer by modulating the intensity of the laser light in accordance with an input signal (here, a signal corresponding to the control data). Also for this case, the processing after the developing is similar to that for the case of wobble.

After this, the first information recording layer 103, which is made of a plurality of optical thin films, is formed by sputtering on the substrate 102. The plurality of optical thin films are, for example, a multi-layer film made of a metal reflective film, a dielectric protection layer, an interface layer, a recording layer, an interface layer and a dielectric protection layer formed in this order on the substrate. In this multi-layer film, it is also possible to leave out one of the interface layers or dielectric layers. Moreover, for the recording layer, a rewritable phase change material including Ge, Te and Sb, a write-once phase change material including Te, Pd and O, for example, or a write-once metal material including Cu and Si can be used. Moreover, it is also possible to provide a pigmented recording layer as the optical thin film, and to use spin-coating instead of sputtering in this case.

After the multi-layered film has been formed on the substrate 102, a spacer layer 104 made of a resin is formed. Using a separately fabricated master stamper (a stamper that is different from the one used for the fabrication of the substrate 102; the method for forming this master stamper is similar to the above-described method for fabricating the master stamper), tracks and embossed pits for recording information signals are formed by a photo-polymerization (2P) method or a method of pressing the master stamper onto a sheet-shaped double-sided tape also on the surface that is formed on the side of the spacer layer 104 on which the second information recording layer is formed. By forming the spacer layer 104 in this manner, the regions of the second information recording layer 105 formed on the spacer layer 104 in a later step can be arranged as shown in FIG. 4.

After the spacer layer 104 has been formed, the second information recording layer 105 is formed by the same method as the first information recording layer 103, but a portion of the laser light for recording/reproduction is transmitted through the second information recording layer 105, so that it has a configuration that is different from that of the optical thin films of the first information recording layer 103. For example, a configuration is conceivable in which the metal reflective layer is formed thinner or eliminated, or a configuration in which the transmittance is increased by providing a dielectric layer with a high refractive index between the metal reflective layer and the spacer layer 104.

After forming the second information recording layer 105, the optically transparent layer 106 is formed. The optically transparent layer 106 can be formed, for example, using a method of applying a light-curing resin and spin-coating, or using a method such as laminating a resin sheet.

As described above, an optical disk 101 in which the regions are arranged at the above-noted positions (see FIG. 4) can be fabricated by forming the substrate 102 and the spacer layer 104 using a master stamper provided with a track or embossed pits corresponding to address signals or control data.

In the optical disk of this embodiment, as shown in FIG. 4, by arranging the control data region 302a at a radial position that overlaps with the second recording learning region 302b, there is no need to add a reserved region to the region opposing the second recording learning region 302b in the first information recording layer. Ordinarily, in the case of single-layer optical disks provided with one information recording layer, there is no other information recording layer (corresponding to the second information recording layer of the optical disk of the present embodiment) in front of the information recording layer (further from the information recording layer to the side from which the laser light is irradiated), so that there is no reserved region for preventing the influence due to the recording learning region in the information recording layer to the front. In the optical disk of the present embodiment, the first information recording layer can be provided with the same region configuration as such a single-layer optical disk. For example, the innermost radius R0 of the user data recording regions 308a and 308b can be made the same as in the case of a single-layer optical disk, so that the recording capacity for the user data is not diminished. Thus, the radius and addresses of the user data regions 308a and 308b are no different from the case of a single-layer disk, so that it becomes easy to access the data for recording or reproduction with the optical disk of the present embodiment using a disk recording/reproducing apparatus. Therefore, it is possible to avoid a reduction of recording capacity of the user data or the like.

Moreover, the protection region 303a is arranged between the control data region 302a and the first recording learning region 304a. The protection region 303a has a width that corresponds to the difference between the innermost radius R1 of the first recording learning region 304a and the outermost radius R2 of the second recording learning region 302b. In this embodiment, the width (R1–R2) of the protection region 303a is set taking into consideration the maximum value ($\Delta e$) of the eccentricity of the tracks of the first and the second information recording layer, the beam diameter (D) of the laser beam in the second information recording layer when the laser light is converged onto the first information recording layer, and the tolerance ($\Delta r$) of the radial position of the track starting end. Thus, even when there is an eccentricity and a tolerance to the tracks, the first recording learning region 304a and the second recording learning region 302b can be arranged such that they do not overlap, so that the recording learning can be carried out suitably. Generally, the eccentricity and tolerance of the tracks may occur in opposite directions between the two information recording layers (i.e. between the first information recording layer and the second information recording layer), so that assuming the worst case, it is preferable that R1–R2 is set to R1–R2$\geq$2$\times$($\Delta e+\Delta r$)+D. Thus, the width of the protection region 303a becomes sufficient, and the recording learning can be performed more appropriately.

Moreover, in the second information recording layer, the reserved region 304b, in which no data is recorded, is arranged at the same radial position as the first recording learning region 304a, so that a stable recording learning can be performed through this second information recording layer that is always in the same state (that is, in an unrecorded state or, if any information are recorded in the reserved region 304b in the future, a state of being recorded at the optimum recording power).

Furthermore, in this embodiment, media-characteristic information, such as the recording pulses of both the first information recording layer and the second information recording layer, are stored in the control data region 302a of the first information recording layer. Thus, all identification information can be obtained by accessing the first information recording layer first, so that there is the advantage that the start-up operation of the optical disk drive becomes faster.

Moreover, an optical disk recording/reproducing apparatus with which user data can be recorded on or reproduced from the dual-layer optical disk of this embodiment ordinarily can record or reproduce user data with respect to single-layer optical disks as well. As noted above, in the dual-layer optical disk of the present embodiment, the position of the first information recording layer with respect to the side from which light is irradiated is the same as the position of the information recording layer with respect to the side from which light is irradiated in a single-layer optical disk that has only one information recording layer. That is to say, the dual-layer optical disk according to the present embodiment has a control data region 302a in a first information recording layer that is arranged at the same position with respect to the side from which light is irradiated as in the information recording layer of a single-layer optical disk. Consequently, when an optical disk recording/reproducing device loads the dual-layer optical disk according to the present embodiment, then laser light can be irradiated onto the control data region 302a using the conditions that are optically the same as for a single-layer optical disk. Therefore, the effect is attained that the identification information can be read in smoothly.

It should be noted that the direction of the recording and the reproduction is set as indicated by the arrows 313a and 313b in FIG. 3, and the user data is recorded continuously from the inner side to the outer side in the first information recording layer, and if the user data recording region 308a of the first information recording layer becomes full, the user data may be recorded from the outer side to the inner side of the second information recording layer. In this case, when the user data is recorded in the first information recording layer, the second information recording layer through which the laser light passes through is in a completely unrecorded state, so that it is possible to use a recording material with which the transmitted light is affected by a recording in the second information recording layer, even at the optimum recording power, thus broadening the range of materials that can be selected for the second information recording layer. Even when using such a recording material, the first recording learning region 304a does not overlap with the second recording learning region 302b in this configuration, so that, needless to say, the recording learning is performed optimally. In particular in write-once optical disks that can be recorded only once, recording ordinarily is carried out continuously from the inner side to the outer side or from the outer side to the inner side as described above, so that the advantages of using the present embodiment are significant.

Embodiment 2

The following is a description of an optical disk according to another embodiment of the present invention. The optical disk according to this embodiment is provided with two information recording layers, and other than the structure of the regions arranged in the information recording layers, it is the same as the optical disk according to Embodiment 1. Consequently, with the optical disk of the present embodiment, a similar effect to the optical disk according to Embodiment 1 can be attained.

Figure 5:
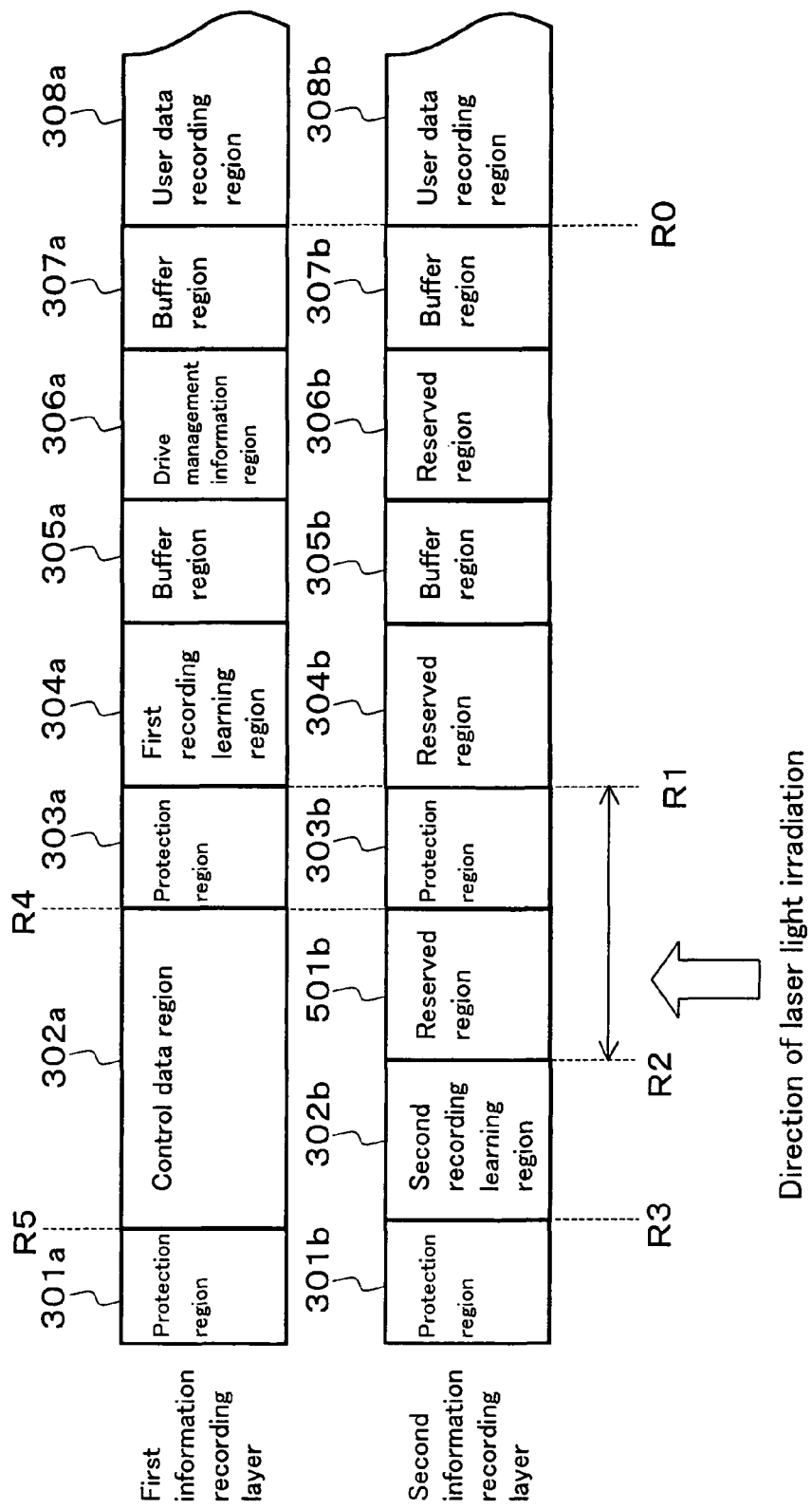
FIG. 5 is a diagram of the arrangement of the regions, which shows the relationship of the radial positions of the main regions included in the first information recording layer and the second information recording layer an the optical disk according to Embodiment 2 of the present invention.

FIG. 5 is a diagram of the arrangement of the regions, which shows the relationship of the radial positions of the main regions included in the first information recording layer and the second information recording layer in the optical disk of the present embodiment. In FIG. 5, the protection region 301a, the control data region 302a, the protection region 303a, the first recording learning region 304a, the buffer region 305a, the drive management information region 306a, the buffer region 307a, and the user data recording region 308a of the first information recording layer are shown in the upper portion. The protection region 301b, the second recording learning region 302b, a reserved region 501b, the protection region 303b, the reserved region 304b, the buffer region 305b, the reserved region 306b, the buffer region 307b, and the user data recording region 308b of the second information recording layer are shown in the lower portion. It should be noted that the regions that are substantially the same as the regions of the optical disk of Embodiment 1 are denoted by the same reference numerals as in Embodiment 1 (see FIG. 4), and their further explanation has been omitted.

In the optical disk of this embodiment, the second recording learning region 302b is arranged in the region in opposition to the control data region 302a. That is to say, the second recording learning region 302b is arranged within the range of radial positions at which the control data region 302a is provided. It should be noted that if there are track eccentricities or tolerances, then a portion of the second recording learning region 302b may protrude slightly from the control data region 302a (and overlap slightly with the protection region 301a), but also in such a case, the second recording learning region 302b is assumed to be arranged within the range of radial positions of the control data region 302a. More specifically, the innermost radius R3 of the second recording learning region 302b is the same as or larger than the innermost radius R5 of the control data region 302a, and the outermost radius R2 of the second recording learning region 302b is arranged to be smaller than the outermost radius R4 of the control data region 302a. As was explained for Embodiment 1, when the laser light passes through the second information recording layer, the quality of the reproduction signal of the control data hardly is affected at all, even when there are intensity changes due to the recording state of the second recording learning region 302b. Furthermore, like in Embodiment 1, by arranging the control data region 302a at a radial position that overlaps with the second recording learning region 302b, there is no need to add a reserved region to the region opposing the second recording learning region 302b in the first information recording layer, and it is possible to provide the first information recording layer with the same regional configuration as a single-layer optical disk. For example, the innermost radius R0 of the user data recording regions 308a and 308b can be made the same as in the case of a single-layer optical disk, so that the recording capacity for the user data is not diminished. Thus, the radius and addresses of the user data regions 308a and 308b are no different from the case of a single-layer disk, so that it becomes easy to access the data for recording or reproduction with the optical disk of the present embodiment using a disk recording/reproducing apparatus. Therefore, it is possible to avoid a reduction of recording capacity of the user data or the like.

Moreover, the reserved region 501b is arranged adjacent to the outer side of the second recording learning region 302b, and the combined width of this reserved region 501b and the protection region 303b corresponds to the difference between the innermost radius R1 of the first recording learning region 304a and the outermost radius R2 of the second recording learning region 302b. In this embodiment, the combined width (R1−R2) of the reserved region 501b and the protection region 303b is set taking into consideration the maximum value (Δe) of the eccentricity of the tracks of the first and the second information recording layer, the beam diameter (D) of the laser beam in the second information recording layer when the laser light is converged onto the first information recording layer, and the tolerance (Δr) of the radial position of the track starting end. Thus, even when there is an eccentricity and a tolerance to the tracks, the first recording learning region 304a and the second recording learning region 302b can be arranged such that they do not overlap, so that the recording learning can be carried out suitably. In this embodiment, not only the protection region 303b, but also the reserved region 501b is used to provide the desired gap between the first information recording learning region and the second information recording learning region. Consequently, the width of the protection region 303a of the first information recording layer and the protection region 303b of the second information recording layer can be made smaller by an amount corresponding to the reserved region 501b, so that a diminishing of the recording capacity of the user data and the like can be suppressed even better.

In the optical disks of the above-described Embodiments 1 and 2, it is also possible to make the track pitch of the prerecorded regions, in particular of the control data region, broader than the track pitch in the recordable regions, in order to stabilize the reproduction of identification information in the control data region. In this case, the prerecorded region in the second information recording layer is only the protection region 301b, so that the track pitch in the protection region 301b can be made the same as in the recordable region.

Embodiment 3

Figure 6:
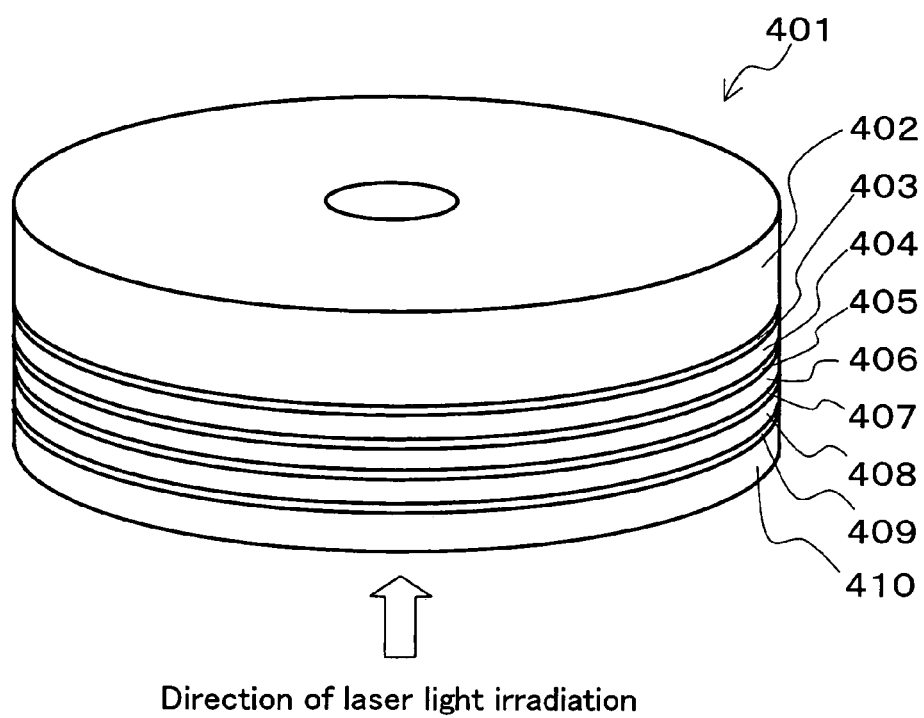
FIG. 6 is a perspective view showing an optical disk according to Embodiment 3 of the present invention.

FIG. 6 is a perspective view showing an optical disk according to yet another embodiment of the present invention. The optical disk 401 according to the present embodiment is a single-side four-layer disk that is provided with four information recording layers, in which recording and reproduction of data on the information recording layers are performed with laser light that is irradiated from one side.

In the optical disk 401 of this embodiment, numeral 402 denotes a substrate, numeral 403 denotes a first information recording layer, numeral 404 denotes a first spacer layer, numeral 405 denotes a second information recording layer, numeral 406 denotes a second spacer layer, numeral 407 denotes a third information recording layer, 408 denotes a third spacer layer, numeral 409 denotes a fourth information recording layer, and numeral 410 denotes an optically transparent layer. The first to third spacer layers 404, 406 and 408 are made of an adhesive resin or the like. Laser light is irradiated from the side of the optically transparent layer 410 and data is recorded in the first information recording layer 403, the second information recording layer 405, the third information recording layer 407, and the fourth information recording layer 409, or reproduced therefrom.

In the four-layer disk 401 of this embodiment, it is preferable that the position of the first information recording layer 403 with respect to the side from which light is irradiated is the same as the position of the information recording layer of a single-layer optical disk (not shown in the drawings) having only one information recording layer with respect to the side from which light is irradiated. Accordingly, regarding the thicknesses of the layers in this embodiment, the optically transparent layer 410 is set to about 40 to 60 µm, the first spacer layer 404, the second spacer layer 406 and the third spacer layer 408 are set to about 15 to 20 µm, the substrate 402 is set to about 1.1 mm, and the first information recording layer 403, the second information recording layer 405, the third information recording layer 407 and the fourth information recording layer 409 are each set to several 10 to several 100 nm, for example.

Figure 7:
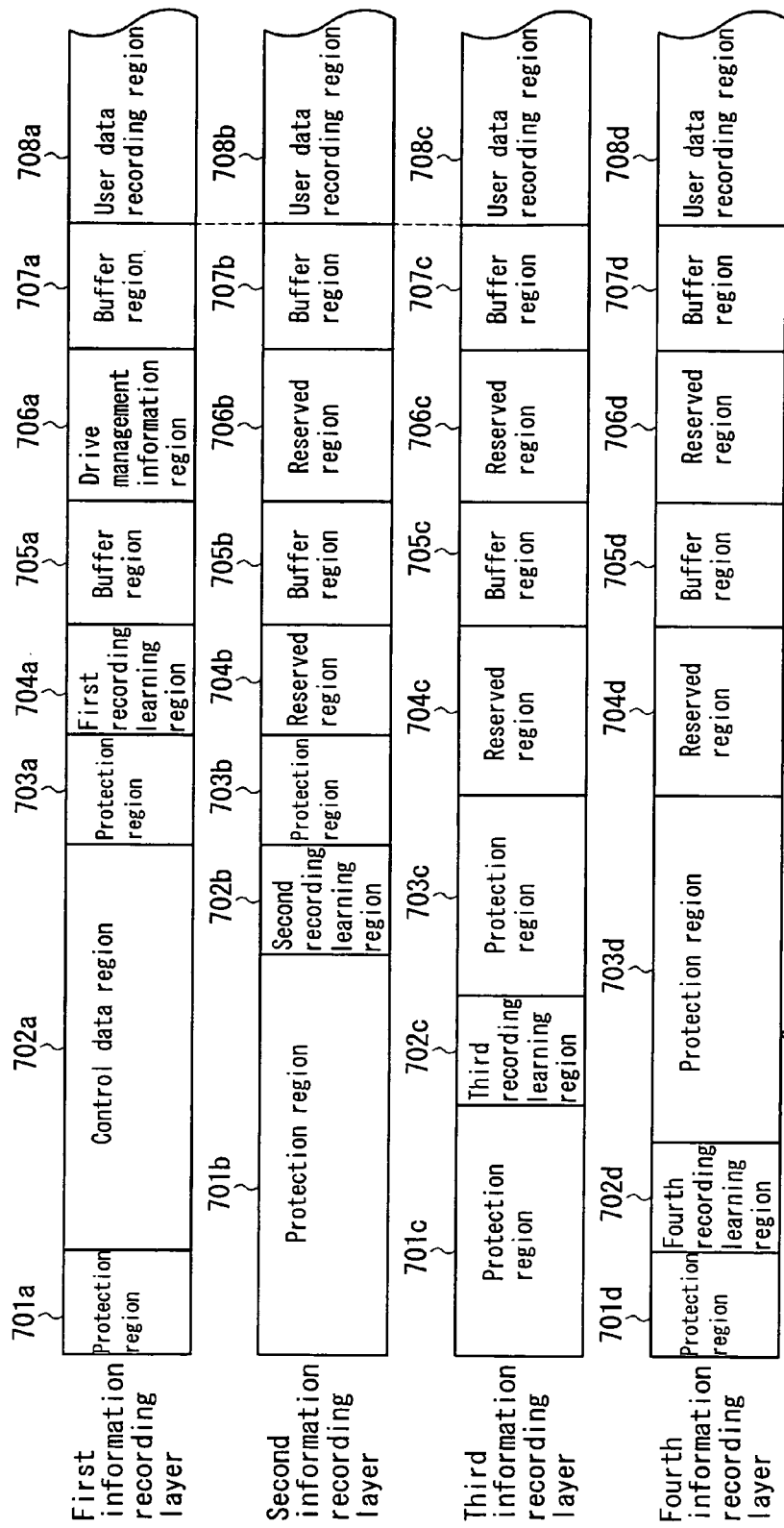
FIG. 7 is a diagram of the arrangement of the regions, which shows the relationship of the radial positions of the main regions included in the first to fourth information recording layers in the optical disk according to Embodiment 3 of the present invention.

FIG. 7 is a diagram showing the relationship of the radial positions of the main regions included in the optical disk of the present embodiment. FIG. 7 shows the first information recording layer at the uppermost level, the second information recording layer at the following level, the third information recording layer at the next following level, and the fourth information recording layer at the lowermost level, and illustrates the arrangement of the regions in each of the information recording layers. In the first information recording layer, a protection region 701a, a control data region 702a, a protection region 703a, a first recording learning region 704a, a buffer region 705a, a drive management information region 706a, a buffer region 707a, and a user data recording region 708a are arranged in that order from the inner circumference of the disk. In the second information recording layer, a protection region 701b, a second recording learning region 702b, a protection region 703b, a reserved region 704b, a buffer region 705b, a reserved region 706b, a buffer region 707b, and a user data recording region 708b are arranged in that order from the inner circumference of the disk. In the third information recording layer, a protection region 701c, a third recording learning region 702c, a protection region 703c, a reserved region 704c, a buffer region 705c, a reserved region 706c, a buffer region 707c, and a user data recording region 708c are arranged in that order from the inner circumference of the disk. And finally in the fourth information recording layer, a protection region 701d, a fourth recording learning region 702d, a protection region 703d, a reserved region 704d, a buffer region 705d, a reserved region 706d, a buffer region 707d, and a user data recording region 708d are arranged in that order from the inner circumference of the disk.

In the optical disk of this embodiment, the second recording learning region 702b, the third recording learning region 702c, and the fourth recording learning region 702d are all arranged within the range of radial positions at which the control data region 702a of the first information recording layer is provided, and overlap with the control data region 702a. That is to say, in this embodiment, the second to fourth information recording layers all correspond to an i-th information recording layer as explained above. Being arranged in this manner, as in the dual-layer optical disks of Embodiment 1 and Embodiment 2, even when the transmittance of the second, third or fourth recording learning regions 702b, 702c and 702d changes due to their recording state, this will not affect the recording learning for the first information recording layer. Consequently, as in the dual-layer optical disks of Embodiment 1 and Embodiment 2, recording learning with high precision becomes possible for the first information recording layer.

Furthermore, in this embodiment, the second recording learning region 702b, the third recording learning region 702c, and the fourth recording learning region 702d are arranged at different radial positions, so that even when the transmittance of the third or fourth recording learning regions 702c and 702d changes due to their recording state, this will not affect the recording learning for the second information recording layer, and even when the transmittance of the fourth recording learning region 702d changes due to its recording state, this will not affect the recording learning for the third information recording layer. Thus, recording learning with high precision becomes possible also for the second and third information recording layers.

Moreover, the third recording learning region 702c and the fourth recording learning region 702d are arranged within the range of radial positions at which the protection region 701b is provided in the second information recording layer, and overlap with the protection region 701b. Furthermore, the fourth recording learning region 702d is arranged within the range of radial positions at which the protection region 701b of the second information recording layer is provided and the protection region 701c of the third information recording layer is provided, and overlaps with the protection regions 701b and 701c. That is to say, in this embodiment, the third and fourth information recording layers correspond to a j-th information recording layer as explained above. This eliminates the need to provide an empty region such as a reserved region in the information recording layers arranged behind (when seen from the side from which the laser light is irradiated) each information recording layer, overlapping with the recording learning region of each information recording layer. As a result, it is possible to realize an optical disk having four information recording layers without reducing the recording capacity in each of the information recording layers.

Furthermore, also with the optical disk of this embodiment, in two information recording layers that are adjacent to each other, it is preferable that the difference (R1−R2) between the innermost radius (R1) of the recording learning region of the information recording layer to the rear (corresponds to a k-th information recording layer as explained above) and the outermost radius (R2) of the recording learning region of the information recording layer to the front (corresponds to a (k+1)-th information recording layer as explained above) is set taking into consideration the maximum value of the track eccentricity, the beam diameter of the laser light, and the tolerance of the radial position of the track starting end, as in the optical disk of Embodiment 1. Moreover, also when recording or reproducing data with the optical disk of this embodiment, first, a portion or all of the control data recorded in the control data region of the first information recording layer is read out by irradiating laser light via at least one of the recording learning regions included in the second to fourth information recording layers onto at least a portion of the control data region, as in the optical disk of Embodiment 1.

Embodiment 4

The following is a description of an optical disk according to yet another embodiment of the present invention. The optical disk according to this embodiment is similar to the optical disk of Embodiment 3, except for the arrangement of the regions arranged in the information recording layers. Consequently, with the optical disk of the present embodiment, a similar effect to the optical disk according to Embodiment 3 can be attained.

Figure 8:
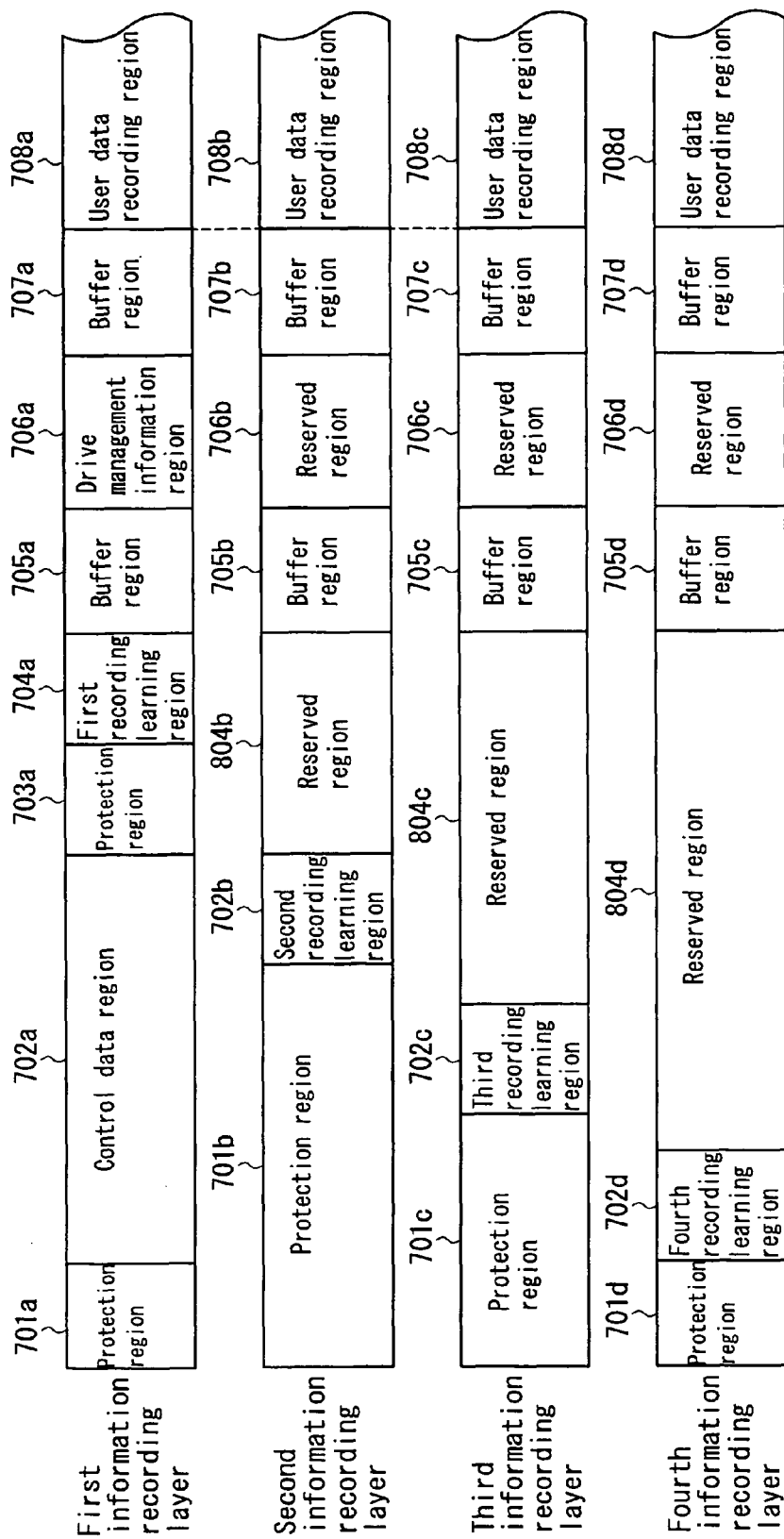
FIG. 8 is a diagram of the arrangement of the regions, which shows the relationship of the radial positions of the main regions included in the first to fourth information recording layers in the optical disk according to Embodiment 4 of the present invention.

FIG. 8 is a diagram showing the relationship of the radial positions of the main regions included in the optical disk of the present embodiment. In the first information recording layer, a protection region 701a, a control data region 702a, a protection region 703a, a first recording learning region 704a, a buffer region 705a, a drive management information region 706a, a buffer region 707a, and a user data recording region 708a are arranged in that order from the inner circumference of the disk. In the second information recording layer, a protection region 701b, a second recording learning region 702b, a reserved region 804b, a buffer region 705b, a reserved region 706b, a buffer region 707b, and a user data recording region 708b are arranged in that order from the inner circumference of the disk. In the third information recording layer, a protection region 701c, a third recording learning region 702c, a reserved region 804c, a buffer region 705c, a reserved region 706c, a buffer region 707c, and a user data recording region 708c are arranged in that order from the inner circumference of the disk. And finally in the fourth information recording layer, a protection region 701d, a fourth recording learning region 702d, a reserved region 804d, a buffer region 705d, a reserved region 706d, a buffer region 707d, and a user data recording region 708d are arranged in that order from the inner circumference of the disk. It should be noted that regions that are substantially the same as the regions of the optical disk explained in Embodiment 3 are denoted by the same reference numerals.

In the second information recording layer of FIG. 8, the protection region 703b and the reserved region 704b of the optical disk of Embodiment 3 have been replaced by a newly provided reserved region 804b. Similarly, in the third information recording layer, the protection region 703c and the reserved region 704c of the optical disk of Embodiment 3 have been replaced by a newly provided reserved region 804c.

And in the fourth information recording layer, the protection region 703d and the reserved region 704d of the optical disk of Embodiment 3 have been replaced by a newly provided reserved region 804d. These reserved regions 804b, 804c and 804d do not overlap with recording learning regions of information recording layers to the front of the information recording layer including these regions, so that it is possible to record new administrative information such as addresses at which there are defects. Thus, it is possible to utilize the regions on the disk more effectively.

Embodiment 5

Figure 9:
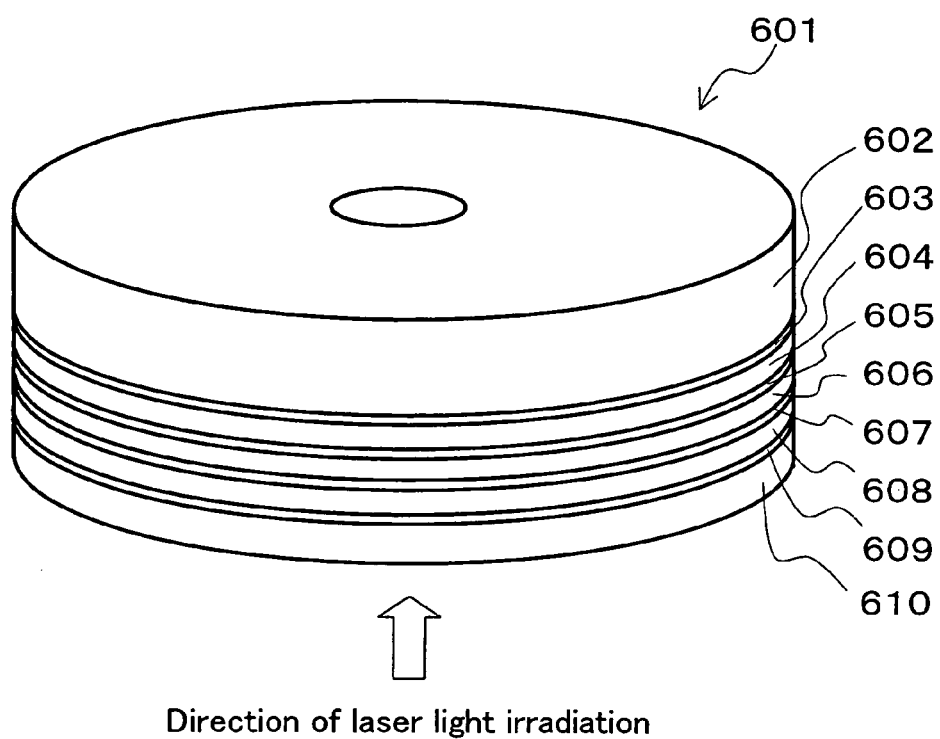
FIG. 9 is a perspective view showing an optical disk according to Embodiment 5 of the present invention.

FIG. 9 is a perspective view showing an optical disk according to yet another embodiment of the present invention. The optical disk 601 according to this embodiment is a single-side four-layer disk that is provided with four information recording layers, in which recording and reproduction of data on the information recording layers are performed with laser light that is irradiated from one side.

In the optical disk 601 of this embodiment, numeral 602 denotes a substrate, numeral 604 denotes a first spacer layer, numeral 605 denotes a first information recording layer, numeral 606 denotes a second spacer layer, numeral 607 denotes a second information recording layer, 608 denotes a third spacer layer, numeral 609 denotes a third information recording layer, and numeral 610 denotes an optically transparent layer. The first to third spacer layers 604, 606 and 608 are made of an adhesive resin or the like. Laser light is irradiated from the side of the optically transparent layer 610 and data is recorded in the first information recording layer 605, the second information recording layer 607, and the third information recording layer 609, or reproduced therefrom. The optical disk 601 of this embodiment is further provided with an information recording layer 603 that is arranged on the side opposite to the side from which laser light is irradiated onto the first information recording layer 605, which is taken as the reference. For the sake of convenience, this information recording layer 603 is referred to as the zero-th information recording layer. As with the other information recording layers, data is recorded in the zero-th information recording layer 603 or reproduced therefrom by irradiating laser light from the side of the optically transparent layer 610.

In the four-layer optical disk of this embodiment, it is preferable that the position of the first information recording layer 605 with respect to the side from which light is incident is the same as the position of the information recording layer of a single-layer optical disk (not shown in the drawings) having only one information recording layer with respect to the side from which light is irradiated. Accordingly, regarding the thicknesses of the layers in this embodiment, the optically transparent layer 610 is set to about 50 to 70 μm, the first spacer layer 604, the second spacer layer 606 and the third spacer layer 608 are set to about 15 to 25 μm, the substrate 602 is set to about 1.1 mm, and the first information recording layer 605, the second information recording layer 607, the third information recording layer 609 and the zero-th information recording layer 603 are set to several 10 to several 100 nm, for example. By taking the information recording layer arranged as the third from the side from which laser light is irradiated as the reference plane, there are two information recording layers remaining on the side from which laser light is irradiated, so that the optically transparent layer 610 and the first to third spacer layers 604, 606 and 608 can be formed thicker than in the case of the optical disk explained in Embodiment 3. Thus, it is possible to reduce optical crosstalk between the information recording layers.

Figure 10:
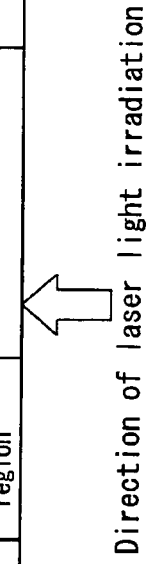
FIG. 10 is a diagram of the arrangement of the regions, which shows the relationship of the radial positions of the main regions included in the first to third information recording layers as well as a further information recording layer arranged to the rear of the first information recording layer with respect to the side from which laser light is irradiated, in the optical disk according to Embodiment 5 of the present invention.

FIG. 10 is a diagram showing the relationship of the radial positions of the main regions included in the optical disk of the present embodiment. FIG. 10 shows the arrangement of the regions in the zero-th information recording layer at the uppermost level, the first information recording layer at the following level, the second information recording layer at the then following level, and the third information recording layer at the lowermost level. In the first information recording layer, a protection region 901a, a control data region 902a, a protection region 903a, a first recording learning region 904a, a buffer region 905a, a drive management information region 906a, a buffer region 907a, and a user data recording region 908a are arranged in that order from the inner circumference of the disk. In the second information recording layer, a protection region 901b, a second recording learning region 902b, a protection region 903b, a reserved region 904b, a buffer region 905b, a reserved region 906b, a buffer region 907b, and a user data recording region 908b are arranged in that order from the inner circumference of the disk. In the third information recording layer, a protection region 901c, a third recording learning region 902c, a protection region 903c, a reserved region 904c, a buffer region 905c, a reserved region 906c, a buffer region 907c, and a user data recording region 908c are arranged in that order from the inner circumference of the disk. And finally in the zero-th information recording layer, a protection region 901d, a control data region 902d, a protection region 903d, a buffer region 905d, a zero-th recording learning region 906d, a buffer region 907d, and a user data recording region 908d are arranged in that order from the inner circumference of the disk.

In the optical disk of this embodiment, the second recording learning region 902b and the third recording learning region 902c overlap with the control data region 902a of the first information recording layer and the control data region 902d of the zero-th information recording layer. That is to say, in this embodiment, the second and third information recording layers correspond to i-th information recording layers as explained above.

Moreover, in the zero-th information recording layer, the protection region 903d is arranged at a location overlapping with the first recording learning region 904a. Furthermore, the third recording learning region 902c is arranged such that it overlaps with the protection region 901b of the second information recording layer. That is to say, in this embodiment, the third information recording layer corresponds to a j-th information recording layer as explained above. Being arranged in this manner, as in the four-layer optical disks of Embodiment 3 and Embodiment 4, even when the transmittance of the first, second, or third recording learning regions changes due to their recording state, this will not affect the recording learning for the zero-th information recording layer. Even when the transmittance of second, or third recording learning regions changes due to their recording state, this will not affect the recording learning for the first information recording layer. Furthermore, by providing also the zero-th information recording layer with a control data region, there are two regions provided with control data, so that the possibility of failure in the readout of control data is reduced, and the user-friendliness of devices using the optical disk of the present embodiment is improved.

Also with the optical disk of this embodiment, in two information recording layers that are adjacent to each other, it is preferable that the difference (R1−R2) between the innermost radius (R1) of the recording learning region of the information recording layer to the rear (corresponds to a k-th information recording layer as explained above) and the outermost radius (R2) of the recording learning region of the information recording layer to the front (corresponds to a (k+1)-th information recording layer as explained above) is set taking into consideration the maximum value of the track eccentricity, the beam diameter of the laser light, and the tolerance of the radial position of the track starting end, as in the optical disk of Embodiment 1. Moreover, also when recording or reproducing data with the optical disk of this embodiment, as in the optical disk of Embodiment 1, the control data recorded in the control data region of the first information recording layer or the zero-th information recording layer is read out by irradiating laser light via the recording learning regions included in the second and third information recording layers onto the control data region to record or reproduce data.

Embodiment 6

The following is a description of an optical disk according to yet another embodiment of the present invention. The optical disk according to this embodiment is similar to the optical disk of Embodiment 5, except for the arrangement of the regions arranged in the information recording layer. Consequently, with the optical disk of the present embodiment, a similar effect to the optical disk according to Embodiment 5 can be attained.

Figure 11:
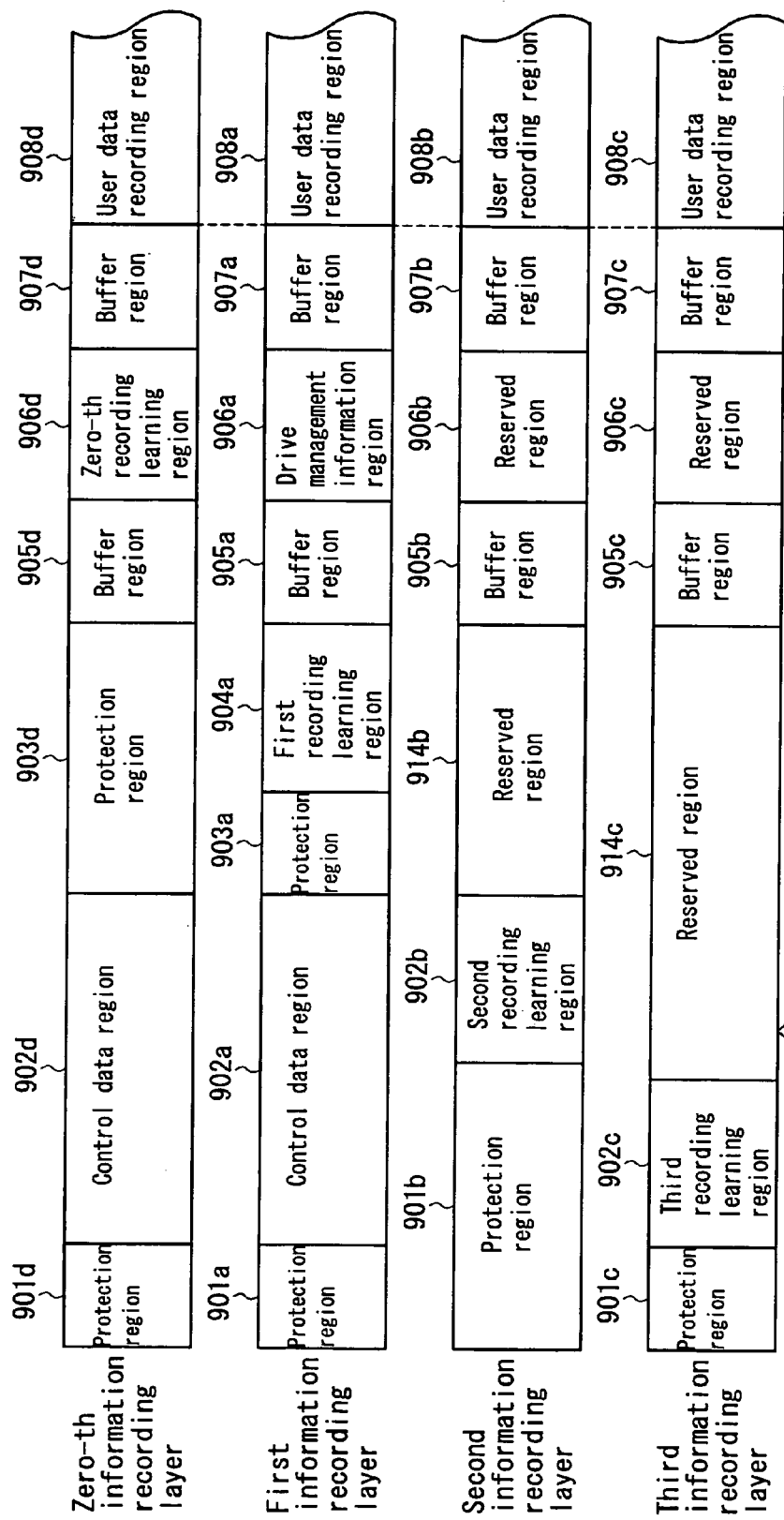
FIG. 11 is a diagram of the arrangement of the regions, which shows the relationship of the radial positions of the main regions included in the first to third information recording layers as well as a further information recording layer arranged to the rear of the first information recording layer with respect to the side from which laser light is irradiated, in the optical disk according to Embodiment 6 of the present invention.

FIG. 11 is a diagram showing the relation of the radial positions of the main regions included in the optical disk of the present embodiment. In the first information recording layer, a protection region 901a, a control data region 902a, a protection region 903a, a first recording learning region 904a, a buffer region 905a, a drive management information region 906a, a buffer region 907a, and a user data recording region 908a are arranged in that order from the inner circumference of the disk. In the second information recording layer, a protection region 901b, a second recording learning region 902b, a reserved region 914b, a buffer region 905b, a reserved region 906b, a buffer region 907b, and a user data recording region 908b are arranged in that order from the inner circumference of the disk. In the third information recording layer, a protection region 901c, a third recording learning region 902c, a reserved region 914c, a buffer region 905c, a reserved region 906c, a buffer region 907c, and a user data recording region 908c are arranged in that order from the inner circumference of the disk. And finally in the zero-th information recording layer, a protection region 901d, a control data region 902d, a protection region 903d, a buffer region 905d, a fourth recording learning region 906d, a buffer region 907d, and a user data recording region 908d are arranged in that order from the inner circumference of the disk. It should be noted that regions that are substantially the same as the regions of the optical disk explained in Embodiment 5 are denoted by the same reference numerals.

In the second information recording layer of FIG. 11, the protection region 903b and the reserved region 904b of the optical disk of Embodiment 5 have been replaced by a newly provided reserved region 914b. Similarly, in the third information recording layer, the protection region 903c and the reserved region 904c of the optical disk of Embodiment 5 have been replaced by a newly provided reserved region 914c. These reserved regions 914b and 914c do not overlap with recording learning regions of information recording layers to the front (the side from which laser light is irradiated) of the information recording layer including these regions, so that it is possible to record new administrative information such as addresses at which there are defects. Thus, it is possible to utilize the regions on the disk more effectively.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disk comprising a plurality of information recording layers, in which data is recorded in tracks by laser light that is irradiated from one side, the tracks being provided respectively in the plurality of information recording layers;

wherein the plurality of information recording layers comprise a first information recording layer, and second to N-th information recording layers (with N being an integer of two or greater) that are arranged further toward the side from which the laser light is irradiated than the first information recording layer and which are arranged in order from the side near the first information recording layer;

wherein the first information recording layer comprises a read-only control data region, a first recording learning region for learning recording parameters to record data in the first information recording layer, and a first user data recording region for recording user data;

wherein the read-only control data region is provided only in the first information recording layer;

wherein, when taking at least one of the second to N-th information recording layers as an i-th information recording layer (with i being an integer satisfying $2 \leq i \leq N$), that i-th information recording layer comprises an i-th recording learning region for learning recording parameters to record data in the i-th information recording layer, an i-th user data recording region for recording user data, and an i-th unrecorded region that is arranged adjacent to the outer side of the i-th recording learning region an in which no data is recorded;

wherein the first recording learning region and the i-th recording learning region are arranged at different radial positions, and the i-th unrecorded region and the i-th recording learning region are arranged within a region of radial positions at which the read-only control data region of the first information recording layer is provided;

wherein an innermost radial position of the recording learning region of the second information recording layer is arranged at a first distance from an innermost radial position of the read-only control data region of the first information recording layer; and wherein when a second distance is a distance between an outermost radial position of the read-only control data region of the first information recording layer and an outermost radial position of the recording learning region of the second information recording layer, the second distance is shorter than the first distance.

2. The optical disk according to claim 1, wherein N is 3 or greater;

wherein at least two information recording layers included in the second to N-th information recording layers each comprise a recording learning region for learning recording parameters to record data; and wherein the recording learning regions included in those two information recording layers are arranged at different radial positions.

3. The optical disk according to claim 1, wherein N is 3 or greater;

wherein, when taking at least one of the third to N-th information recording layers as a j-th information recording layer (with j being an integer satisfying $3 \leq j \leq N$), that j-th information recording layer comprises a j-th recording learning region for learning recording parameters to record data in the j-th information recording layer; and wherein the j-th recording learning region is arranged within a region of radial positions at which regions are provided in which no data recording is performed in the second to (j−1)-th information recording layer.

4. The optical disk according to claim 1, wherein a k-th information recording layer (with k being an integer satisfying $1 \leq k \leq N-1$) included in the first to N-th information recording layers comprises a k-th recording learning region for learning recording parameters to record data in the k-th information recording layer, and a (k+1)-th information recording layer included in the first to N-th information recording layers comprises a (k+1)-th recording learning region for learning recording parameters to record data in the (k+1)-th information recording layer; and wherein an innermost radius (R1) of the k-th recording learning region, an outermost radius (R2) of the (k+1)-th recording learning region, and a maximum value (Δe) of a track eccentricity in the k-th information recording layer and the (k+1)-th information recording layer satisfy the following relationship:

$$R1-R2 \geq 2\Delta e.$$

5. The optical disk according to claim 1, wherein a k-th information recording layer (with k being an integer satisfying $1 \leq k \leq N-1$) included in the first to N-th information recording layers comprises a k-th recording learning region for learning recording parameters to record data in the k-th information recording layer, and a (k+1)-th information recording layer included in the first to N-th information recording layers comprises a (k+1)-th recording learning region for learning recording parameters to record data in the (k+1)-th information recording layer; and wherein an innermost radius (R1) of the k-th recording learning region, an outermost radius (R2) of the (k+1)-th recording learning region, a maximum value (Δe) of a track eccentricity in the k-th information recording layer and the (k+1)-th information recording layer, and a beam diameter (D) of the laser light in the (k+1)-th information recording layer when the laser light is converged onto the k-th information recording layer satisfy the following relationship:

$$R1-R2 \geq 2\Delta e+D.$$

6. The optical disk according to claim 1, wherein a k-th information recording layer (with k being an integer satisfying $1 \leq k \leq N$) included in the first to N-th information recording layers comprises a k-th recording learning region for learning recording parameters to record data in the k-th information recording layer, and a (k+1)-th information recording layer included in the first to N-th information recording layers comprises a (k+1)-th recording learning region for learning recording parameters to record data in the (k+1)-th information recording layer; and wherein an innermost radius (R1) of the k-th recording learning region, an outermost radius (R2) of the (k+1)-th recording learning region, a maximum value (Δe) of a track eccentricity in the k-th information recording layer and the (k+1)-th information recording layer, and a tolerance (Δr) of a radial position of a track starting end satisfy the following relationship:

$$R1-R2 \geq 2(\Delta e+\Delta r).$$

7. The optical disk according to claim 1,
wherein a k-th information recording layer (with k being an integer satisfying 1≤k≤N−1) included in the first to N-th information recording layers comprises a k-th recording learning region for learning recording parameters to record data in the k-th information recording layer, and a (k+1)-th information recording layer included in the first to N-th information recording layers comprises a (k+1)-th recording learning region for learning recording parameters to record data in the (k+1)-th information recording layer; and
wherein an innermost radius (R1) of the k-th recording learning region, an outermost radius (R2) of the (k+1)-th recording learning region, a maximum value (Δe) of a track eccentricity in the k-th information recording layer and the (k+1)-th information recording layer, a tolerance (Δr) of a radial position of the track starting end, and a beam diameter (D) of the laser light in the (k+1)-th information recording layer when the laser light is converged onto the k-th information recording layer satisfy the following relationship:

$R1-R2 \geq 2(\Delta e = \Delta r) + D.$

8. The optical disk according to claim 1, wherein a distance from the side from which the laser light is irradiated to the first information recording layer is equivalent to a distance, in an optical disk having a single information recording layer, from the side from which the laser light is irradiated to the single information recording layer.

9. The optical disk according to claim 1, wherein control data relating to the first to N-th information recording layers is stored in the control data region.

10. The optical disk according to claim 1, wherein writing of user data to the first to N-th information recording layers is performed continuously from a radially inward side to a radially outward side or from the radially outward side to the radially inward side.

11. The optical disk according to claim 1, wherein control data is pre-recorded in the control data region by at least one selected from embossed pits, wobble grooves and wobble pits.

12. The optical disk according to claim 1,
wherein at least the control data region, the first recording learning region and the first user data recording region are arranged in that order from a radially inward side in the first information recording layer; and
wherein at least the i-th recording learning region and the i-th user data recording region are arranged in that order from a radially inward side in the i-th information recording layer.

13. The optical disk according to claim 1, wherein the plurality of information recording layers further comprise an information recording layer that is arranged on a side opposite to the side from which laser light is irradiated with respect to the first information recording layer.

14. The optical disk according to claim 1,
wherein the plurality of information recording layers consist of two information recording layers that are the first information recording layer and the second information recording layer;
wherein the second information recording layer includes a second recording learning region for learning recording parameters to record data in the second information recording layer, and a second user data recording region for recording user data; and
wherein the first recording learning region and the second recording learning region are arranged in regions with different radial positions, and the second recording learning region is arranged within a region of radial positions at which the control data region of the first information recording layer is provided.

15. The optical disk according to claim 14,
wherein at least the control data region, the first recording learning region, and the first user data recording region are arranged in that order from the radially inward side in the first information recording layer; and
wherein at least the second recording learning region and the second user data recording region are arranged in that order from the radially inward side in the second information recording layer.

16. The optical disk according to claim 14,
wherein an innermost radius (R1) of the first recording learning region, an outermost radius (R2) of the second recording learning region, and a maximum value (Δe) of a track eccentricity in the first information recording layer and the second information recording layer satisfy the following relationship:

$R1-R2 \geq 2\Delta e.$

17. The optical disk according to claim 14,
wherein an innermost radius (R1) of the first recording learning region, an outermost radius (R2) of the second recording learning region, a maximum value (Δe) of a track eccentricity in the first information recording layer and the second information recording layer, and a beam diameter (D) of the laser light in the second information recording layer when the laser light is converged onto the first information recording layer satisfy the following relationship:

$R1-R2 \geq 2\Delta e + D.$

18. The optical disk according to claim 14,
wherein an innermost radius (R1) of the first recording learning region, an outermost radius (R2) of the second recording learning region, a maximum value (Δe) of a track eccentricity in the first information recording layer and the second information recording layer, and a tolerance (Δr) of a radial position of a track starting end satisfy the following relationship:

$R1-R2 \geq 2(\Delta e + \Delta r).$

19. The optical disk according to claim 14,
wherein an innermost radius (R1) of the first recording learning region, an outermost radius (R2) of the second recording learning region, a maximum value (Δe) of a track eccentricity in the first information recording layer and the second information recording layer, a tolerance (Δr) of a radial position of a track starting end, and a beam diameter (D) of the laser light in the second information recording layer when the laser light is converged onto the first information recording layer satisfy the following relationship:

$R1-R2 \geq 2(\Delta e + \Delta r) + D.$

20. A method for manufacturing an optical disk comprising a first information recording layer and second to N-th information recording layers (with N being an integer of two or greater) that are arranged further toward the side from which the laser light is irradiated than the first information recording layer and which are arranged in order from the side near the first information recording layer; the method comprising:
forming the first information recording layer such that the first information recording layer comprises at least a read-only control data region, a first recording learning region for learning recording parameters to record data in the first information recording layer, and a first user data recording region for recording user data;

wherein the read-only control data region is provided only in the first information recording layer;

when taking at least one of the second to N-th information recording layers as an i-th information recording layer (with i being an integer satisfying $2 \leq i \leq N$), forming that i-th information recording layer such that the i-th information recording layer comprises an i-th recording learning region for learning recording parameters to record data in the i-th information recording layer, an i-th user data recording region for recording user data, and an i-th unrecorded region that is arranged adjacent to the outer side of the i-th recording learning region and in which no data is recorded;

forming the first recording learning region and the i-th recording learning region such that the first recording learning region and the i-th recording learning region are arranged at different radial positions, and the i-th unrecorded region and the i-th recording learning region are arranged within a region of radial positions at which the control data region of the first information recording layer is provided;

forming the read-only control data region and the recording learning region of the second information recording layer such that an innermost radial position of the recording learning region of the second information recording layer is arranged at a first distance from an innermost radial position of the read-only control data region of the first information recording layer; and wherein when a second distance is a distance between an outermost radial position of the read-only control data region of the first information recording layer and an outermost radial position of the recording learning region of the second information recording layer, the second distance is shorter than the first distance.

21. A recording method for recording data in tracks by irradiating laser light from one side of an optical disk, the tracks being provided respectively in a plurality of information recording layers included in the optical disk;

wherein the optical disk comprises a first information recording layer, and second to N-th information recording layers (with N being an integer of two or greater) that are arranged further toward the side from which the laser light is irradiated than the first information recording layer and which are arranged in order from the side near the first information recording layer;

wherein the first information recording layer comprises a read-only control data region, a first recording learning region for learning recording parameters to record data in the first information recording layer, and a first user data recording region for recording user data;

wherein the read-only control data region is provided only in the first information recording layer;

wherein the second to N-th information recording layers respectively comprise a second to N-th recording learning region for learning recording parameters to record data in the second to N-th information recording layers, and a second to N-th user data recording region for recording user data;

wherein the first recording learning region and an i-th recording learning region (with i being an integer satisfying $2 \leq i \leq N$) are arranged at different radial positions, an i-th unrecorded region, in which no data is recorded, is arranged adjacent to the outer side of the i-th recording learning region, and the i-th unrecorded region and the i-th recording learning region are arranged within a region of radial positions at which the control data region of the first information recording layer is provided;

wherein an innermost radial position of the recording learning region of the second information recording layer is arranged at a first distance from an innermost radial position of the read-only control data region of the first information recording layer;

wherein when a second distance is a distance between an outermost radial position of the read-only control data region of the first information recording layer and an outermost radial position of the recording learning region of the second information recording layer, the second distance is shorter than the first distance; and wherein, before data is recorded in the first to N-th information recording layers, laser light is irradiated via at least one of the second to N-th recording learning regions to at least a portion of the control data region, and control data that is recorded in the control data region is reproduced.

22. A reproduction method for reproducing data recorded in tracks by irradiating laser light from one side of an optical disk, the tracks being provided respectively in a plurality of information recording layers included in the optical disk;

wherein the optical disk comprises a first information recording layer, and second to N-th information recording layers (with N being an integer of two or greater) that are arranged further toward the side from which the laser light is irradiated than the first information recording layer and which are arranged in order from the side near the first information recording layer;

wherein the first information recording layer comprises a read-only control data region, a first recording learning region for learning recording parameters to record data in the first information recording layer, and a first user data recording region for recording user data;

wherein the second to N-th information recording layers respectively comprise a second to N-th recording learning region for learning recording parameters to record data in the second to N-th information recording layers, and a second to N-th user data recording region for recording user data;

wherein the first recording learning region and an i-th recording learning region (with i being an integer satisfying $2 \leq i \leq N$) are arranged at different radial positions, an i-th unrecorded region, in which no data is recorded, is arranged adjacent to the outer side of the i-th recording learning region, and the i-th unrecorded region and the i-th recording learning region are arranged within a region of radial positions at which the control data region of the first information recording layer is provided;

wherein the read-only control data region is provided only in the first information recording layer;

wherein an innermost radial position of the recording learning region of the second information recording layer is arranged at a first distance from an innermost radial position of the read-only control data region of the first information recording layer;

wherein when a second distance is a distance between an outermost radial position of the read-only control data region of the first information recording layer and an outermost radial position of the recording learning region of the second information recording layer, the second distance is shorter than the first distance; and wherein, before data is reproduced from the first to N-th information recording layers, laser light is irradiated via at least one of the second to N-th recording learning regions to at least a portion of the control data region, and control data that is recorded in the control data region is reproduced.

23. The optical disk according to claim 1, wherein the read-only control data region is placed only in the first information recording layer.

* * * * *

UNITED STATES PATENT AND TRADEMARK OFFICE
CERTIFICATE OF CORRECTION

PATENT NO. : 8,169,883 B2
APPLICATION NO. : 10/876494
DATED : May 1, 2012
INVENTOR(S) : Miyagawa et al.

Page 1 of 1

It is certified that error appears in the above-identified patent and that said Letters Patent is hereby corrected as shown below:

Title page of the patent, (75) Inventors, the first inventor Naoyasu Miyagawa's address:
"Kawanishi (JP)" should be -- Hyogo (JP) --.
Title Page 2, (56) FOREIGN PATENT DOCUMENTS, line 5, after JP 2001-311346, "11/2000" should be -- 11/2001 --.

In the Claims:

In column 21, line 33, (claim 1), "an" should be -- and --.
In column 23, line 23, (claim 7), "$(\Delta e=\Delta r)+D.$" should be -- $(\Delta e+\Delta r)+D.$ --.

Signed and Sealed this
Twenty-third Day of April, 2013

Teresa Stanek Rea
*Acting Director of the United States Patent and Trademark Office*